United States Patent
Sundararajan et al.

(10) Patent No.: US 11,934,755 B2
(45) Date of Patent: Mar. 19, 2024

(54) DIGITAL TWIN LUBRICATION SIMULATION

(71) Applicant: International Business Machines Corporation, Armonk, NY (US)

(72) Inventors: Mukundan Sundararajan, Bangalore (IN); Sarbajit K. Rakshit, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 606 days.

(21) Appl. No.: 17/082,230

(22) Filed: Oct. 28, 2020

(65) Prior Publication Data
US 2022/0129606 A1   Apr. 28, 2022

(51) Int. Cl.
*G06F 30/27* (2020.01)
*G06F 119/08* (2020.01)

(52) U.S. Cl.
CPC .......... *G06F 30/27* (2020.01); *G06F 2119/08* (2020.01)

(58) Field of Classification Search
CPC .. G06F 30/27; G06F 2119/08; G06F 2119/02; G06F 30/17; G06F 30/15; G06F 2113/08
USPC ........................................................ 703/8, 6
See application file for complete search history.

(56) References Cited

U.S. PATENT DOCUMENTS

| | | | |
|---|---|---|---|
| 11,562,227 B2 * | 1/2023 | Abhinav | G06N 3/08 |
| 11,676,098 B2 * | 6/2023 | Berti | G06K 7/10297 |
| | | | 705/28 |
| 11,687,805 B2 * | 6/2023 | Stubbs | H04L 67/12 |
| | | | 706/12 |

(Continued)

FOREIGN PATENT DOCUMENTS

| | | | | |
|---|---|---|---|---|
| CN | 109615113 A | | 4/2019 | |
| WO | WO2023172292 | * | 9/2023 | ............ H04W 16/02 |

OTHER PUBLICATIONS

"Estimation of Remaining Useful Life of Locomotive Traction Motor Bearing", An IP.com Prior Art Database Technical Disclosure, Authors et. al.: Disclosed Anonymously, IP.com No. IPCOM000251320D, IP.com Electronic Publication Date: Oct. 30, 2017, 6 pages.

(Continued)

*Primary Examiner* — Juan C Ochoa
(74) *Attorney, Agent, or Firm* — Stephanie L. Carusillo

(57) ABSTRACT

Systems, methods and computer program products leveraging digital twin modeling and cognitive computing to predict lubrication replacement for a physical asset. Predictions of lubrication replacement consider one or more various parameters such as operating conditions, usage parameters, the surrounding environment, overall health and state of repair of the physical asset, lubricant properties and historically collected data from the physical asset (or similarly comparable assets). Timing for optimal lubrication replacement is identified using the collected data of the physical asset, along with historical data, to simulate changes in a state of lubricants and lubricated parts within a physical asset using digital twin modeling to make predictions how one or more actions upon the physical asset impact the health, stability and/or longevity of the lubricant's lifespan. Based on the simulation results, recommended action(s) suitable for increasing and optimizing the overall life of the lubrication are provided and/or implemented.

14 Claims, 9 Drawing Sheets

(56) References Cited

U.S. PATENT DOCUMENTS

| | | | |
|---|---|---|---|
| 2016/0328883 A1* | 11/2016 | Parfenov | G06F 40/169 |
| 2019/0156600 A1 | 5/2019 | Potyrailo | |
| 2019/0158270 A1* | 5/2019 | Berti | G06F 21/30 |
| 2019/0287079 A1 | 9/2019 | Shiraishi | |
| 2023/0058169 A1* | 2/2023 | Cella | G06F 11/3055 |
| 2023/0300626 A1* | 9/2023 | Montalvo | H04W 72/0453 370/329 |

OTHER PUBLICATIONS

"Lubricant", Wikipedia, This page was last edited on Jun. 17, 2020, at 20:57, 14 pages.

"Lubrication Properties", Technology Transfer Services, Feb. 6, 2014, 6 pages., <https://www.techtransfer.com/blog/lubrication-properties/>.

"Smart Digital Twin Asset Timeline with Incentivization Schema", An IP.com Prior Art Database Technical Disclosure, Authors et. al.: Disclosed Anonymously, IP.com No. IPCOM000261456D, IP.com Electronic Publication Date: Mar. 4, 2020, 6 pages.

Ahmed et al., "Tribology—Fundamentals and Advancements", Submitted: Apr. 4, 2012, Reviewed: Feb. 2, 2013, Published: May 22, 2013, DOI: 10.5772/56043, 24 pages, <https://www.intechopen.com/books/tribology-fundamentals-and-advancements/lubrication-and-lubricants>.

Gerke, Grant, "GE Digital Twin Technology Revamps Offshore Oil Operations", Efficient Plant, Mar. 7, 2018, 12 pages, <https://www.efficientplantmag.com/2018/03/ge-digital-twin-technology-revamps-offshore-oil-operations>.

Luo, Jianbin, "Thin Film Lubrication", Springer Link, Encyclopedia of Tribology, 2013 Edition, DOI: https://doi.org/10.1007/978-0-387-92897-5_682, 5 pages.

Mell et al., "The NIST Definition of Cloud Computing", Recommendations of the National Institute of Standards and Technology, Special Publication 800-145, Sep. 2011, 7 pages.

Parr, Gary, "AI, Digital-Twin Technologies and Manufacturing's Future", Efficient Plant, Jan. 25, 2018, 10 pages, <https://www.efficientplantmag.com/2018/01/ai-digital-twin-technologies-manufacturings-future/>.

Siemens PLM, "Make an impact in the real world with Digital Twins", Jul. 2, 2019, Eureka!, 6 pages, <https://www.eurekamagazine.co.uk/design-engineering-blogs/digital-twins-help-build-the-real-world/216932/>.

* cited by examiner

DIGITAL TWIN LUBRICATION SIMULATION

TECHNICAL FIELD

The present disclosure relates generally to the field of digital twins and more specifically to digital twin simulations using cognitive computing.

BACKGROUND

A digital twin is a virtual representation of a physical object, system, or other assets. The digital twin tracks changes to the physical object, system, or asset across the object's lifespan and records the changes to the object over time by digitally documenting the changes within the digital twin as those changes occur to the physical object. Digital twins are a complex virtual model that is a counterpart to the physical asset existing in real space. Sensors, recording systems, and internet-of-things (IoT) devices connected to the physical asset collect data, often in real-time. The collected data can be mapped to the virtual model of the digital twin. Any individual with access to the digital twin can see real-time information about the physical asset operating in the real world without having to be physically present and viewing the physical asset during operation. Rather, users, such as engineers, can use the digital twin to understand not only how the physical asset is performing, but to predict how the physical asset may perform in the future, using the collected data from sensors, IoT devices, and other sources of data and information being collected. Moreover, digital twins can help manufacturers and providers of physical assets with information that helps the manufacturer understand how customers continue to use the products after the purchasers have bought the physical asset.

SUMMARY

Embodiments of the present disclosure relate to a computer-implemented method, an associated computer system, and computer program product for simulating a physical asset using digital twins and as a function of the simulation, maximizing the lifespan of lubricant performance in a physical asset represented by the digital twin. The computer-implemented method comprises creating, by at least one processor, a digital twin model representing a physical asset comprising one or more components and a lubricant; capturing, by the at least one processor, a real-time data feed from at least one data collection device connected to the physical asset, wherein the real-time data feed describes operation conditions of the physical asset, including a state of the lubricant; updating, by the at least one processor, the digital twin model to accurately reflect the physical asset based on real-time data extracted from the real-time data feed and further updating a knowledge corpus with the real-time data; simulating, by the at least one processor, a plurality of temporal sequences based on the knowledge corpus, predicting one or more actions and resulting effects of the one or more actions on a breakdown of the lubricant over a time period; identifying, by the at least one processor, a temporal sequence from the plurality of temporal sequences comprising the one or more actions predicted to maximize an amount of time before the physical asset experiences the breakdown of the lubricant; outputting, by the at least one processor, a recommendation comprising the one or more actions predicted to maximize the amount of time before the physical asset experiences the breakdown of the lubricant; and applying, by the at least one processor, the one or more action predicted to maximize the amount of time before the physical asset experiences the breakdown of the lubricant to the digital twin model.

DETAILED DESCRIPTION

Figure 1:
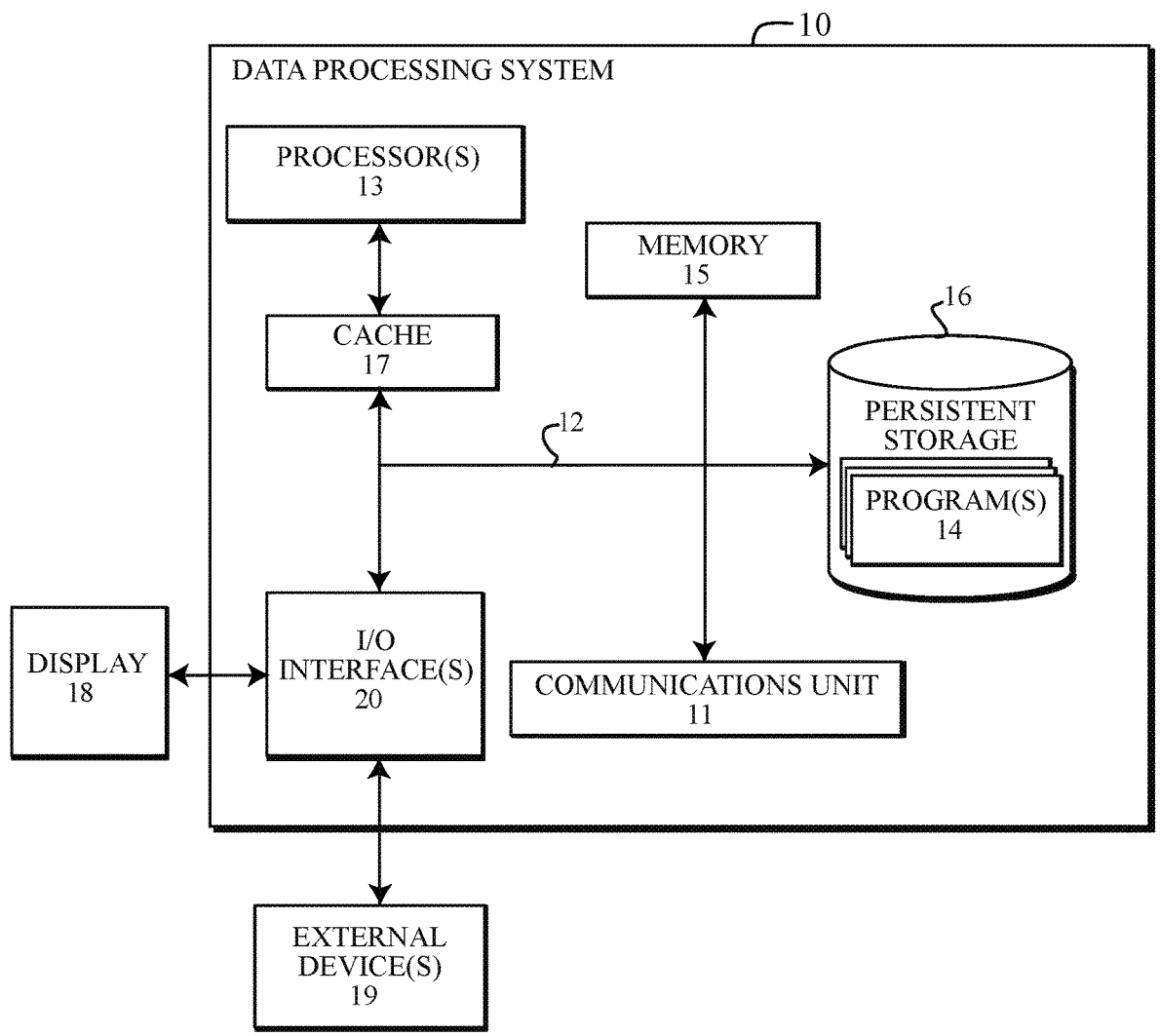
FIG. 1 depicts an embodiment of a block diagram of internal and external components of a data processing system in which embodiments described herein may be implemented in accordance with the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

Overview

As physical assets change over time, through modifications, updates, wear, tear, or even damage, digital twins mimic the changes to accurately reflect the current state of the physical asset over time. Real-time data feeds from sensor devices, IoT devices, recording devices, and other data-generating systems, capture performance information outputted by physical assets in real-time, monitor performance, and environmental changes as a result of variations to a physical asset's configuration, design, components, maintenance, workload, etc. The real-time data collection and reflection by the digital twin allows for users of the digital twin, such as owners, operators, and engineers to compute and predict future issues that may arise, solve functionality problems, optimize performance and simulate how particular actions or changes to the physical asset impact the longevity of the physical asset's performance and lifespan.

Physical assets, such as machines, apparatuses, and systems may utilize lubricated parts and components to achieve optimal performance while minimizing the production of heat or friction due to the movement of parts within these machines or systems. Lubrication can help dissipate heat from building up within the machine, reduce friction, and improve the overall performance of the physical asset. Changes in working conditions, surrounding environments, the applied payloads and workloads, temperatures generated, designs of the machine, and the properties of the lubricant can all be driving factors that impact changes in the lubricants and the timely manner in which lubrications may need to be replaced. A lubricant may be broadly described as a substance capable of reducing friction, heat, and wear when the substance is introduced between solid surfaces. For example, as a film, grease, oil, or other forms. Properties of a lubricant may include the presence of a high boiling point and/or a low freezing point, allowing the lubricant to remain liquid within a wide range of temperatures. For instance, lubricants can remain a liquid even under harsh operating temperatures that can range upwards between 100° C. to 800° C. or temperatures falling below 0° C. to −70° C. Additional properties of lubricants may include films, greases, and oils with a high viscosity index (even while operating within harsh operating temperature ranges), and high thermal stability that resists decreased performance at extreme temperatures. For example, resistance to lubricant breakdowns at high temperatures or resistance to congealing at low temperatures. Moreover, lubricants may also be described as having a high resistance to oxidation, capable of preventing or decreasing corrosion of parts and components, resistance to shearing forces as well as resistance to being demulsified or separated under harsh temperature or pressure conditions.

Lubrication within a machine or system can break down and degrade over time. For example, in response to repeated exposure to one or more certain environmental and/or operating conditions, including exposure to excessive heat caused by friction between moving parts. In order to prolong the life of physical assets, such as machines, systems, or apparatuses, the replacement of lubricants, as well as repairs or replacements of failing components can be performed from time to time and may occur at regularly scheduled intervals, as part of routine maintenance or may occur as needed to keep the physical asset in optimal working order. Regularly maintaining lubricated systems, parts, and components with a proper amount and type of lubrication or identifying regular replacement intervals for the lubricant can be difficult. Improper lubrication procedures, selecting a lubrication type, failing or misaligned components, improper settings, and configurations, continued stressful working conditions such as harsh temperatures, heavy workloads, dusty or other environmental factors, can all impact the rate at which a lubricant breaks down, making lubrication breakdown difficult to predict. There is therefore a need for a system, method, and/or computer program product capable of analyzing one or more of the factors that may contribute to the breakdown of a lubricant within a physical asset, accurately predict one or more actions that may prolong or shorten the lifespan of a lubricant within a physical asset and/or recommend procedures, maintenance schedules, repairs, and replacement of lubrication, in order to optimize the lifespan of lubricants within the physical asset, identify the proper timing for changing lubricants and prevent lubrication breakdown before it occurs.

Embodiments of the present disclosure leverage the use of digital twin models, data collected about the physical asset using onboard or surrounding collection devices, including one or more sensors, IoT devices, and recording systems, historically collected data from similar types and models of physical assets, and/or cognitive computing or artificial intelligent systems configured to monitor the status of lubricants within a physical asset, in order to identify sources of premature lubrication breakdown, simulate measures for optimizing lubrication performance, predict optimal actions for prolonging the lifespan of lubricants, identifying a timing for replacing the lubricant and/or recommending one or more actions to achieve the optimal performance of lubricants within the physical asset. When performing simulations and making predictions about a physical asset, embodiments of the present disclosure may consider the operating condition of the physical asset, properties of the lubricant, the amount and/or state of the lubricant, the working environment of the physical asset, environmental parameters such as temperature, dust, moisture, etc. and the overall health of the physical asset. The predictions and recommended actions being provided can include but are not limited to: recommendations directed toward the optimal timing intervals between replacing lubrication under one or more types of operating conditions; recommended working conditions and payloads; replacement of parts and components (either preventive or by predicting part and component failures); recommended timings, settings or configuration adjustments of the physical asset; routine maintenance schedules; and/or changes to the type of lubrication being used.

Embodiments of the present disclosure may generate predictions and recommended actions for prolonging the lifespan of lubricants of a physical asset using digital twin models and simulating various working conditions of the physical asset and actions capable of increasing the performance, health, and output of the physical asset. Embodiments of the present disclosure can create digital twin models from one or more digital twin files, computerized drawings such as CAD files, specifications, or other data sources describing the parts, components, and configurations of the physical asset. Physical assets associated with the digital twin model can be equipped with one or more sensors, IoT devices, and recording systems capturing performance, environmental, and operational data of the physical asset, in real-time, as the physical is being used. The collected data about the physical asset, along with historical data describing lubricant performance, lubricant breakage, and the historical performance of the physical asset under particular operating conditions, can be stored in one or more repositories, where the data can be used to build a knowledge corpus about the physical asset's performance, operations and learn about the expected performance of the physical asset based on the history of the collected data. Moreover, historical data describing the performance of the physical asset, as well as other similar physical assets, with similar performance outputs, uses, and working environments can be incorporated into the knowledge corpus and may be used to influence the conclusions drawn by a knowledge corpus when generating simulation results and recommendations.

Using the knowledge corpus built from the performance and operational data, as well as historical data, embodiments of the present disclosure can simulate the physical asset's performance over time, predictively generate one or more sequential timelines of digital twins describing a series of actions performed to maintain the lubrication lifespan of the physical asset and further predict effects of one the one or more actions being performed to alleviate or exacerbate premature lubrication breakdowns. For example, simulating predicted thermal images of the physical assets over a future time frame to determine how the lubricants heat up and degrade over time and eventually break as well as determine the optimal timing for changing the lubricant before breakdown occurs.

Based on the simulations and the predictive timelines of the generated digital twin models, embodiments of the present disclosure may output a report identifying one or more causes of the predicted premature lubrication breakdown within the various predictive timelines of digital twin models. In some embodiments, the outputted report may include one or more recommended actions, repairs, maintenance schedules, operating conditions or environments, payload size, type or frequency of lubricants, or other preventative measures for prolonging or maximizing the lifespan of lubricants within a physical asset, recommendations for preventing the premature breakdown of lubricants within a physical asset, timings for changing the existing lubricants, and further recommendations for improving the overall health and longevity of the physical assets during various modes of operation or working conditions. In some embodiments, the outputted report may describe one or more of the digital twin timelines comprising simulations of the physical asset as part of a user interface. The interface may include the plurality of digital twin versions, and a user may manually review each of the predicted timelines comprising a plurality of digital twin models and users may select one or more actions to apply to the physical asset, based on the results of the selected actions depicted by the simulations represented by the various timelines describing the digital twin models.

Data Processing System

The present invention may be a system, a method, and/or a computer program product at any possible technical detail level of integration. The computer program product may include a computer-readable storage medium (or media) having the computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

FIG. 1 illustrates a block diagram of a data processing system 10, which may be a simplified example of a computing system capable of performing the computing operations described herein. Data processing system 10 may be representative of the one or more computing systems or devices depicted in the computing environment 200, 250, 300, as shown in FIGS. 2A-6D, and in accordance with the embodiments of the present disclosure. It should be appreciated that FIG. 1 provides only an illustration of one implementation of a data processing system 10 and does not imply any limitations regarding the environments in which different embodiments may be implemented. In general, the components illustrated in FIG. 1 may be representative of any electronic device capable of executing machine-readable program instructions.

While FIG. 1 shows one example of a data processing system 10. A data processing system 10 may take many different forms, including bare metal computer systems, virtualized computer systems, container-oriented architecture, and microservice-oriented architecture. For example, data processing system 10 can take the form of real or virtualized systems including but not limited to personal desktop computer systems, laptops, notebooks, tablets, servers, clients, network devices, network terminals, thin clients, thick clients, kiosks, mobile communication devices (e.g., smartphones), multiprocessor systems, microprocessor-based systems, minicomputer systems, mainframe computer systems, smart devices, or Internet of Things (IoT) devices 121. The data processing systems 10 can operate in a local computing environment, networked computing environment 200, a containerized computing environment 250, and/or a distributed cloud computing environment 300, which can include any of the systems or devices described herein and/or additional computing devices or systems known or used by a person of ordinary skill in the art.

Data processing system 10 may include communications fabric 12, which can provide for electronic communications between one or more processor(s) 13, memory 15, persistent storage 16, cache 17, communications unit 11, and one or more input/output (I/O) interface(s) 20. Communications fabric 12 can be implemented with any architecture designed for passing data and/or controlling information between processor(s) 13 (such as microprocessors, communications, and network processors, etc.), memory 15, external devices 19, and any other hardware components within a data processing system 10. For example, communications fabric 12 can be implemented as one or more buses, such as an address bus or data bus.

Memory 15 and persistent storage 16 may be computer-readable storage media. Embodiments of memory 15 may include random access memory (RAM) and cache 17 memory. In general, memory 15 can include any suitable volatile or non-volatile computer-readable storage media and may comprise firmware or other software programmed into the memory 15. Program(s) 14, software applications, user processes, and services, described herein, may be stored in memory 15 and/or persistent storage 16 for execution and/or access by one or more of the respective processor(s) 13 of the data processing system 10.

Persistent storage 16 may include a plurality of magnetic hard disk drives. Alternatively, or in addition to magnetic hard disk drives, persistent storage 16 can include one or more solid-state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 16 can also be removable. For example, a removable hard drive can be used for persistent storage 16. Other examples include optical and magnetic disks, thumb drives, and smart cards that are inserted into a drive for transfer onto another computer-readable storage medium that is also part of persistent storage 16.

Communications unit 11 provides for the facilitation of electronic communications between data processing systems 10. For example, between one or more computer systems or devices via a communication network 150. In the exemplary embodiment, communications unit 11 may include network adapters or interfaces such as a TCP/IP adapter cards, wireless interface cards, or other wired or wireless communication links. Communication networks can comprise, for example, copper wires, optical fibers, wireless transmission, routers, firewalls, switches, gateway computers, edge servers, and/or other network hardware which may be part of, or connect to, nodes of the communication networks including devices, host systems, terminals or other network computer systems. Software and data used to practice embodiments of the present disclosure can be downloaded to the computer systems operating in a network environment through communications unit 11 (e.g., via the Internet, a local area network, or other wide area networks). From communications unit 11, the software and the data of program(s) 14 can be loaded into persistent storage 16.

One or more I/O interfaces 20 may allow for input and output of data with other devices that may be connected to data processing system 10. For example, I/O interface 20 can provide a connection to one or more external devices 19 such as one or more smart devices, IoT devices 121, recording systems 123 such as camera systems, including thermal imaging devices, one or more sensor device(s) 119, input devices such as a keyboard, computer mouse, touch screen, virtual keyboard, touchpad, pointing device, or other human interface devices. External devices 19 can also include portable computer-readable storage media such as, for example, thumb drives, portable optical or magnetic disks, and memory cards. I/O interface 20 may connect to human-readable display 18. Human-readable display 18 provides a mechanism to display data to a user and can be, for example, computer monitors or screens. Human-readable display 18 can also be an incorporated display and may function as a touch screen, such as a built-in display of a tablet computer.

System for Simulating Lubricants of a Digital Twin

Referring to the drawings, FIGS. 2A-6D depict an approach that can be executed using one or more data processing systems 10 operating within a computing environment 200, 250, 300 to implement systems, methods, and computer program products for simulating lubrication systems using digital twin workflows of physical assets 117, optimizing lubricant lifespan, calculating optimal timings for replacing lubricants, predicting and/or recommending one or actions or preventative measures for maximizing the life of lubricant of the physical asset 117 based on digital twin simulations. Embodiments of computing environments 200, 250, 300 may include one or more data processing systems 10 interconnected via a device network 150. The data processing systems 10 connected to the device network 150 may be specialized systems or devices that may include, but are not limited to, the interconnection of one or more digital twin systems 101, client system 127, host system 201, historical data source(s) 141 and/or repository 131, and physical assets 117 which may comprise one or more sensor device(s) 119, IoT device(s) 121, and/or recording system(s) 123.

The data processing systems 10 exemplified in FIGS. 2A-6D, may not only comprise the elements of the systems and devices depicted in the drawings of FIGS. 2A-6D, but these specialized data processing systems depicted may further incorporate one or more elements of a data processing system 10 shown in FIG. 1, and described above. Although not shown in the figures, one or more elements of the data processing system 10 may be integrated into the embodiments of digital twin system 101, host system 201, physical asset 117, sensor device(s) 119, IoT device(s) 121, recording systems(s) 123, client system 127, computing systems that are hosting repository 131, and historical data source(s). This includes (but is not limited to) the integration of one or more processor(s) 13, program(s) 14, memory 15, persistent storage 16, cache 17, communications unit 11, input/output (I/O) interface(s) 20, external device(s) 19 and human-readable display(s) 18.

Embodiments of the digital twin system 101, host system 201, physical asset 117, client system 127, repository 131, historical data source(s) 141, sensor device(s) 119, IoT device(s) 12, recording system(s) 123 and other data processing systems 10, may be placed into communication with one another via computer network 150. Embodiments of network 150 may be constructed using wired, wireless, or fiber-optic connections. Embodiments of the digital twin system 101, host system 201, physical asset 117, client system 127, repository 131, historical data source(s) 141, sensor device(s) 119, IoT device(s) 12, recording system(s) 123 and other data processing systems 10, may connect and communicate over the network 150 via a communications unit 11, such as a network interface controller, network interface card or other network communication device capable of facilitating a connection with network 150. In some embodiments of computing environments 200, 250, 300, one or more embodiments of the digital twin system 101, host system 201, physical asset 117, client system 127, repository 131, historical data source(s) 141, sensor device(s) 119, IoT device(s) 12, recording system(s) 123 may represent a data processing systems 10 utilizing clustered computers and components acting as a single pool of seamless resources when accessed through network 150. For example, such embodiments can be used in a data center, cloud computing, storage area network (SAN), and network-attached storage (NAS) applications.

Embodiments of the communications unit 11 may implement specialized electronic circuitry, allowing for communication using a specific physical layer and a data link layer standard. For example, Ethernet, Fiber channel, Wi-Fi or Token Ring to transmit data between the digital twin system 101, host system 201, physical asset 117, client system 127, repository 131, historical data source(s) 141, sensor device(s) 119, IoT device(s) 12, recording system(s) 123231 and other data processing systems 10 connected to network 150. Communications unit 11 may further allow for a full network protocol stack, enabling communication over network 150 to groups of digital twin system 101, host system 201, physical asset 117, client system 127, repository 131, historical data source(s) 141, sensor device(s) 119, IoT device(s) 12, recording system(s) 123 and other data processing systems 100 linked together through communication channels of network 150. Network 150 may facilitate communication and resource sharing among the digital twin system 101, host system 201, physical asset 117, client system 127, repository 131, historical data source(s) 141, sensor device(s) 119, IoT device(s) 12, recording system(s) 123 and other data processing systems 10 (for example, network-accessible storage media) connected to the network 150. Examples of network 150 may include a local area network (LAN), home area network (HAN), wide area network (WAN), backbone networks (BBN), peer to peer networks (P2P), campus networks, enterprise networks, the Internet, cloud computing networks and any other network known by a person skilled in the art.

Cloud computing networks are a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 300 is service-oriented with a focus on statelessness, low coupling, modularity, and semantic interoperability. At the heart of cloud computing is an infrastructure that includes a network 150 of interconnected nodes 310.

Figure 3:
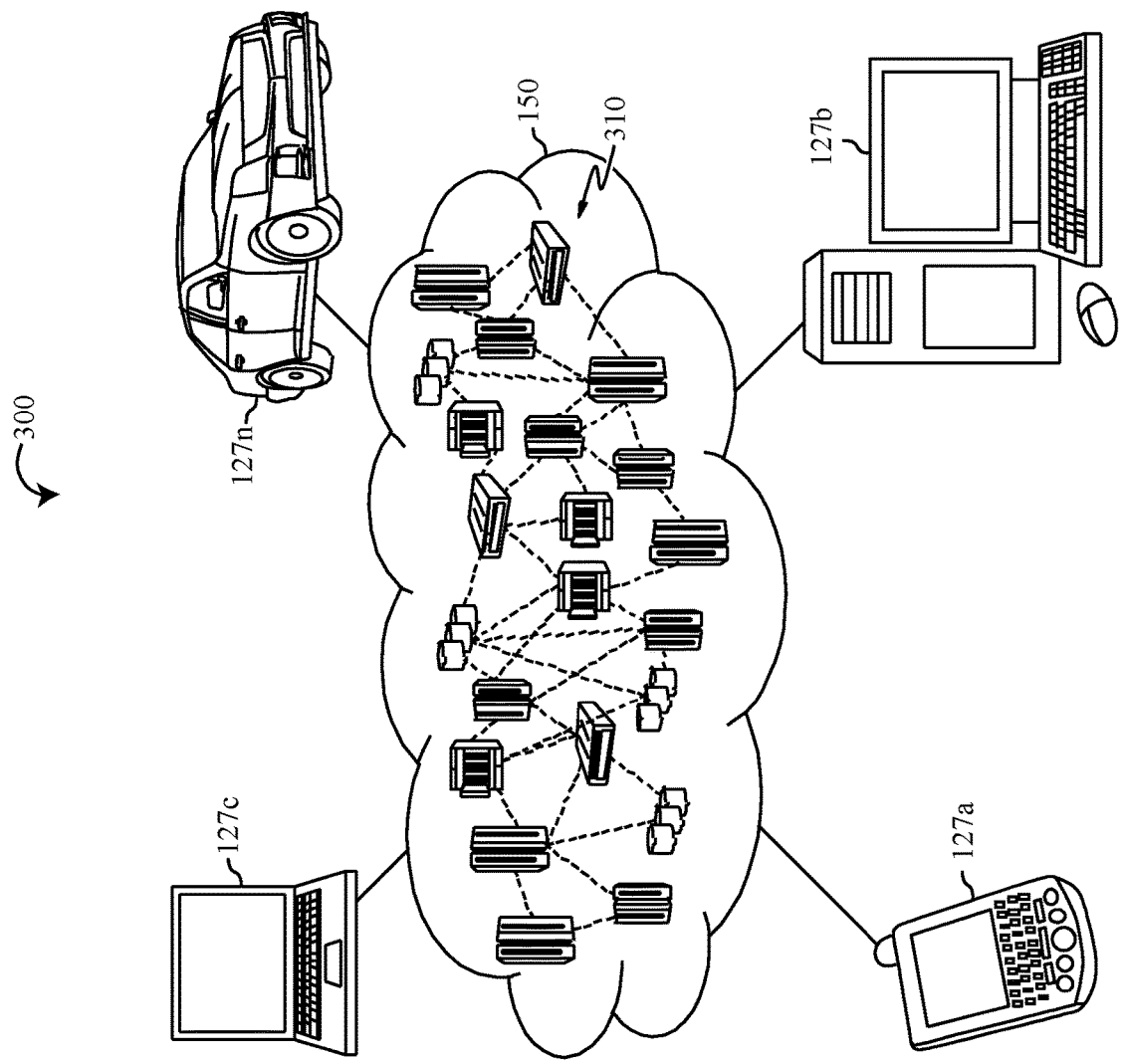
FIG. 3 depicts an embodiment of a cloud computing environment within which embodiments described herein may be implemented, in accordance with the present disclosure.

Referring to the drawings, FIG. 3 is an illustrative example of a cloud computing environment 300. As shown, cloud computing environment 300 includes one or more cloud computing nodes 310 with which client systems 127 operated by the cloud consumers, may communicate with the cloud computing environment 300. For example, client systems 127a, 127b, 127c . . . 127n as illustrated in FIG. 3. Nodes 310 of the cloud computing environment 300 may communicate with one another and may be grouped (not shown) physically or virtually, in one or more networks, such as Private, Community, Public, or Hybrid clouds as described hereinabove, or a combination thereof. This may allow the cloud computing environment 300 to offer infrastructure, platforms, and/or software as services for which a cloud consumer does not need to maintain resources on a client system 127. It is understood that the types of client systems 127 connected to the cloud computing environment 300, are intended to be illustrative only and that computing nodes 310 of the cloud computing environment 300 can communicate with any type of computerized device over any type of network and/or network addressable connection (e.g., using a web browser).

Figure 4:
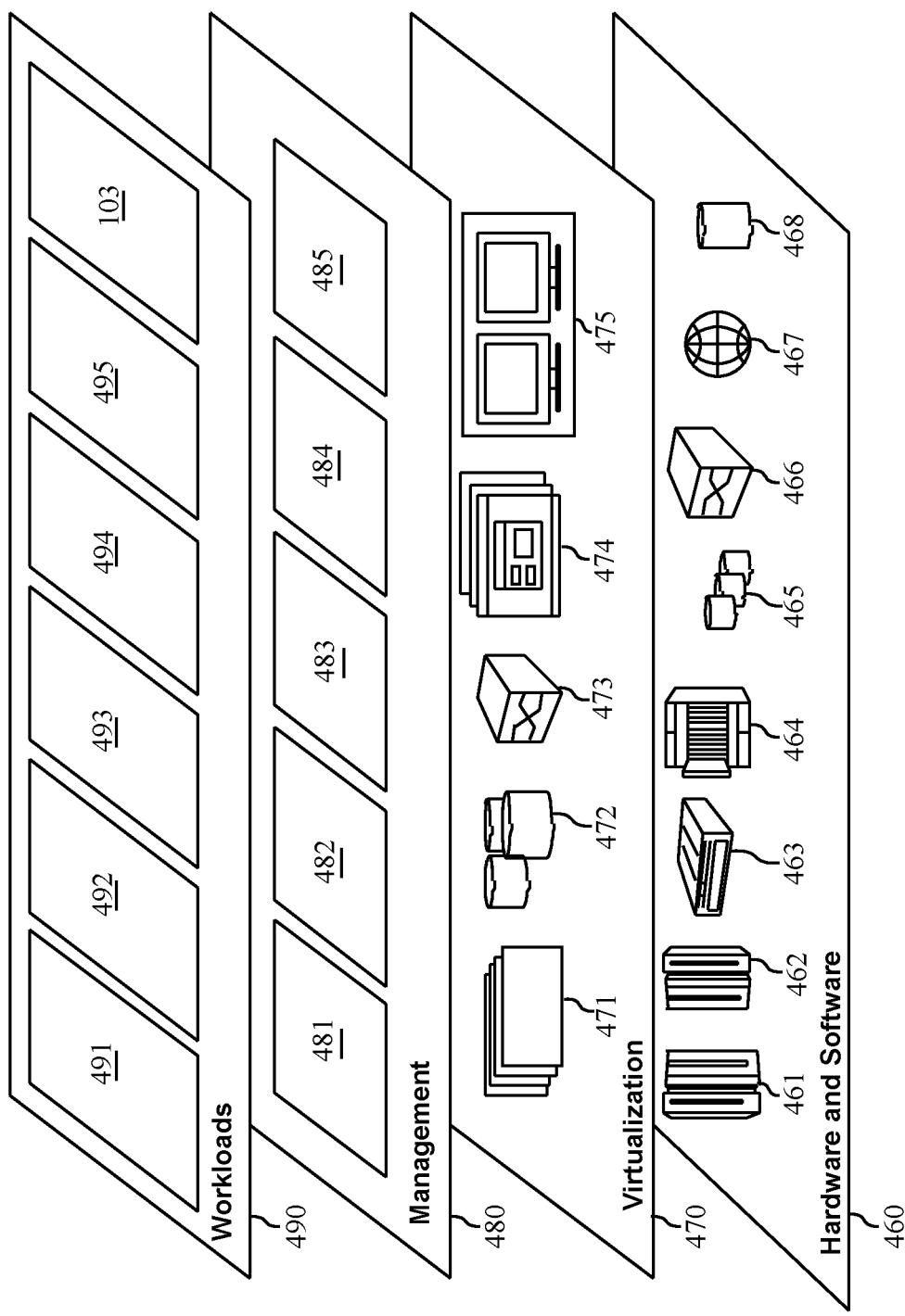
FIG. 4 depicts an embodiment of abstraction model layers of a cloud computing environment, in accordance with the present disclosure.

Referring now to FIG. 4, a set of functional abstraction layers provided by cloud computing environment 300 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 460 includes hardware and software components. Examples of hardware components include mainframes 461; RISC (Reduced Instruction Set Computer) architecture-based servers 462; servers 463; blade servers 464; storage devices 465; and networks and networking components 466. In some embodiments, software components include network application server software 467 and database software 468.

Virtualization layer 470 provides an abstraction layer from which the following examples of virtual entities may be provided: virtual servers 471; virtual storage 472; virtual networks 473, including virtual private networks; virtual applications and operating systems 474; and virtual clients 475.

In one example, management layer 480 may provide the functions described below. Resource provisioning 481 provides dynamic procurement of computing resources and other resources that are utilized to perform tasks within the cloud computing environment 300. Metering and pricing 482 provide cost tracking as resources are utilized within the cloud computing environment 300, and billing or invoicing for consumption of these resources. In one example, these resources can include application software licenses. Security provides identity verification for cloud consumers and tasks, as well as protection for data and other resources. User portal 483 provides access to the cloud computing environment 300 for consumers and system administrators. Service level management 484 provides cloud computing resource allocation and management such that required service levels are met. Service Level Agreement (SLA) planning and fulfillment 485 provide pre-arrangement for, and procurement of, cloud computing resources for which a future requirement is anticipated in accordance with an SLA.

Workloads layer 490 provides examples of functionality for which the cloud computing environment may be utilized. Examples of workloads and functions which may be provided from this layer include mapping and navigation 491, software development and lifecycle management 492, virtual classroom education delivery 493, data analytics processing 494, transaction processing 495, and digital twin services provided by digital twin module 103, which may be accessed by the client system 127 via the digital twin interface 129.

Figure 2A:
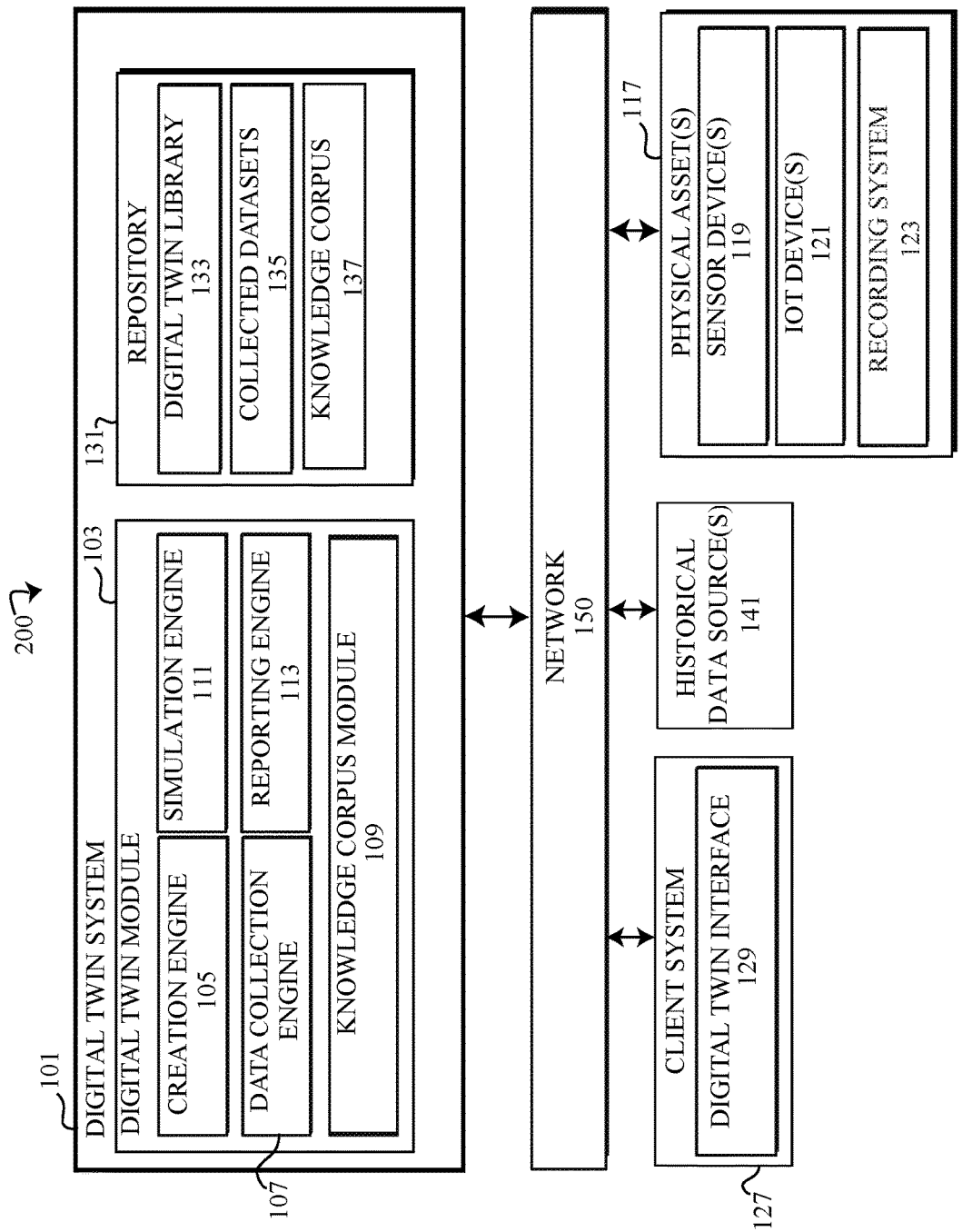
FIG. 2A depicts a block diagram of an embodiment of a computing environment for creating, modeling, and/or simulating a digital twin, in accordance with the present disclosure.

Referring back to the drawings, FIG. 2A depicts an embodiment of a computing environment 200, 250, 300 capable of creating and updating digital twin models 134 stored by a digital twin library 133 and simulates, using one or more versions of a digital twin model 134, the lifecycle of the parts, components, lubricants and systems of the physical assets 117 represented by the digital twin model 134. The simulations of the physical assets 117 using the digital twin models 134 may predict failures of parts and components including the breakdown of lubricants, and recommend one or more actions, repairs, preventive measures, and/or maintenance schedules for optimizing said lifecycles of the parts, components, lubricants, and systems, including recommended timings for replacing lubricants in the physical asset, before breakdown occurs. As a result of the simulations, embodiments can further diagnose parts, components, settings, configurations, and environmental factors that may be contributing to the premature breakdown of the lubricants of the physical asset 117, including the identification of such factors such as excessive vibration or friction causing heat, wear and tear on the parts, components and the lubricants. For example, due to failing, misaligned, or faulty parts and components, or even the inclusion of an improper lubricant and/or insufficient amount of lubricant within the physical asset 117.

Embodiments of computing environment 200, 250 can comprise a device network 150 connecting a plurality of specialized data processing systems 10, including (but not limited to) interconnecting digital twin system 101 or host system 201 with one or more physical asset(s) 117, which may be equipped with one or more sensor device(s) 119, IoT Device(s) 121, and recording system(s) 123, and one or more client systems 127 capable of accessing the digital twin system 101 via the digital twin interface 129. The data processing systems 10 of the computing environments 200, 250, 300 may comprise specialized configurations of hardware, software, or a combination thereof, as shown and described herein, including specialized modules for implementing one or more particular tasks, functions, or operations associated with creating versions of digital twin models 134, managing multiple versions of the digital twin, collecting sensor, IoT, and recording data from the physical asset 117, including environmental data describing the surrounding environment of the physical asset 117, perform simulations of the physical asset 117 using one or more digital twin models 134, report the simulation results and make recommendations, adjustments or actions to prolong the life of the systems, components, parts, and lubricants of the physical asset 117. The term "module" may refer to a hardware module, software module, or a module may be a combination of hardware and software resources. Embodiments of hardware-based modules may include self-contained components such as chipsets, specialized circuitry, one or more memory 15 devices, and/or persistent storage 16. A software-based module may be part of a program 14, program code, or linked to program code containing specifically programmed instructions loaded into a memory 15 device or persistent storage 16 device of one of the data processing systems 10 operating as part of the computing environment 200, 250, 300. For example, the digital twin module 103 depicted in FIG. 2A may be loaded into the memory 15 or persistent storage 16 of digital twin system 101.

As shown in the exemplary embodiment of FIG. 2A, embodiments of the computing environment 200 may include digital twin system 101. The digital twin system 101 may be a computer system or another type of data processing system 10 connected to network 150, which can provide services to other systems or users connected to the network 150. As shown in FIG. 2A, the digital twin system 101 may provide digital twin services via the digital twin module 103 to users connecting and accessing the digital twin module 103 via a client system 127 through a digital twin interface 129. The digital twin services may be provided to owners, purchasers, licensees, manufacturers, sellers, licensors, and other authorized individuals (collectively referred to generally as "users") of the digital twins being accessed. Embodiments of the digital twin system 101 may execute program code of the digital twin module 103 to perform one or more functions or operations of the digital twin module 103, including, but not limited to retrieving and creating digital twin models 134; aggregating, organizing and storing data generated by sensor device(s) 119, IoT devices 121 and/or recording systems 123 of the physical asset(s) 117; monitoring changes in the operating conditions of the physical asset 117, including the operation of the parts, components, lubricants, and performance of the physical asset 117 as reflected by the digital twin models 134; simulating operating conditions and performance of the physical asset 117 over time using one or more digital twin models 134; predicting the performance of lubricated parts, components and systems over time and into a future predicted timeframe; reporting simulation results to users; and making one or more recommendations and/or providing proposed actions to the users, based on the simulation results, in order to optimize the life of lubricants and lubricated parts or components and minimize the occurrence of lubricants breaking down and damaging the physical asset 117. One or more individual functions or features of the digital twin module 103 may be implemented by one or more subprocesses or sub-modules of the digital twin module 103. For example, the exemplary embodiment of the digital twin module 103 depicted in FIG. 2A, the digital twin module 103 comprises a creation engine 105, data collection engine 107, knowledge corpus module 109, simulation engine 111, and reporting engine 113.

Embodiments of the creation engine 105 may perform tasks or functions associated with creating a new digital twin model 134 reflecting a current state of a physical asset 117 or the creation engine 105 may associate existing digital twin models 134 with a new user or owner who may be receiving an existing digital twin. For example, a user purchasing a previously used physical asset 117 that was previously owned or used by another user, that has an associated digital twin model(s) 134 that has been previously created and is transferred to the new owner. Each of the digital twin models 134 may be stored as part of a digital twin library 133. In some embodiments, initial versions of the digital twin models 103 depicting the brand-new physical asset 117 provided by the manufacturer at the time of purchase, may be referred to as the "base form". The digital twin of the new base form may be provided as a digital twin model 134 to the digital twin module 103 and/or stored by the repository 131 as a digital twin model 134 within the digital twin library 133.

Figure 5A:
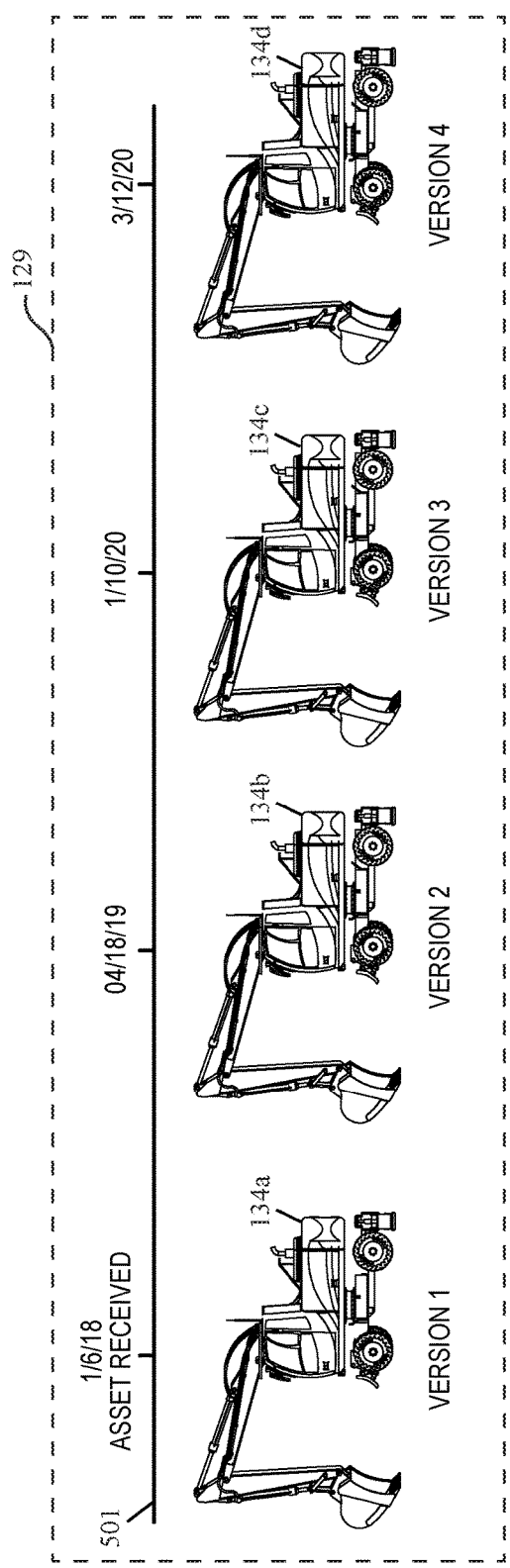
FIG. 5A provides an illustration depicting an embodiment of a temporal sequence displaying a plurality of digital twin versions tracking one or more changes to a physical asset, in accordance with the present disclosure.

In some embodiments, the creation engine 105 may receive specifications of the physical assets 117 from users, manufacturer, or third parties, in the form of one or more digital twin files describing the parts, components, and systems, including lubrication systems, lubricants (and properties thereof) of the physical asset 117. Embodiments of the creation engine 105 may create a digital twin model 134 depicting the original base form of the physical asset 117 from the supplied specifications of the physical asset 117 (e.g. referred to as the "base asset") and store the digital twin model 134 generated from one or more digital twin files and specifications of the physical asset to the digital twin library 133. An example of a base asset depicting the physical asset 117 at the time the physical asset 117 was provided to the owner can be seen in FIG. 5A. As shown in the example of FIG. 5A, the digital twin model 133*a*, depicts version 1 of the physical asset 117 at the time the physical asset 117 is received. This may be as a brand-new asset, straight from the manufacturer, a refurbished version of the physical asset 117, or a used asset that may have been received from a previous owner.

Embodiments of the creation engine 105 may further create additional digital twin models 134 representing different versions of the physical asset 117 over time. As the physical asset 117 changes over time, including changes to one or more components, configurations, hardware, software, firmware, maintenance, repairs, or as measured by one or more sensor devices 119, IoT devices 121, recording systems 123, including measurements of heat output depicted in thermal images, the creation engine 105 may create a new digital twin model 134 reflecting the current state and/or condition of the physical asset 117 as a digital twin model 134. Embodiments of the creation engine 105 may store the plurality of different digital twin models 134, (for example, digital twin models 134*a*-134*d* as shown in FIG. 5A) in a digital twin library 133. Embodiments of the digital twin library 133 may be maintained as part of repository 131 and may comprise one or more digital twin models of the physical asset's lubricant, digital twins depicting each and every machine part or component of the physical asset 117, and digital twin models of the physical asset fully assembled and in working condition, including the lubricant(s).

Figure 5B:
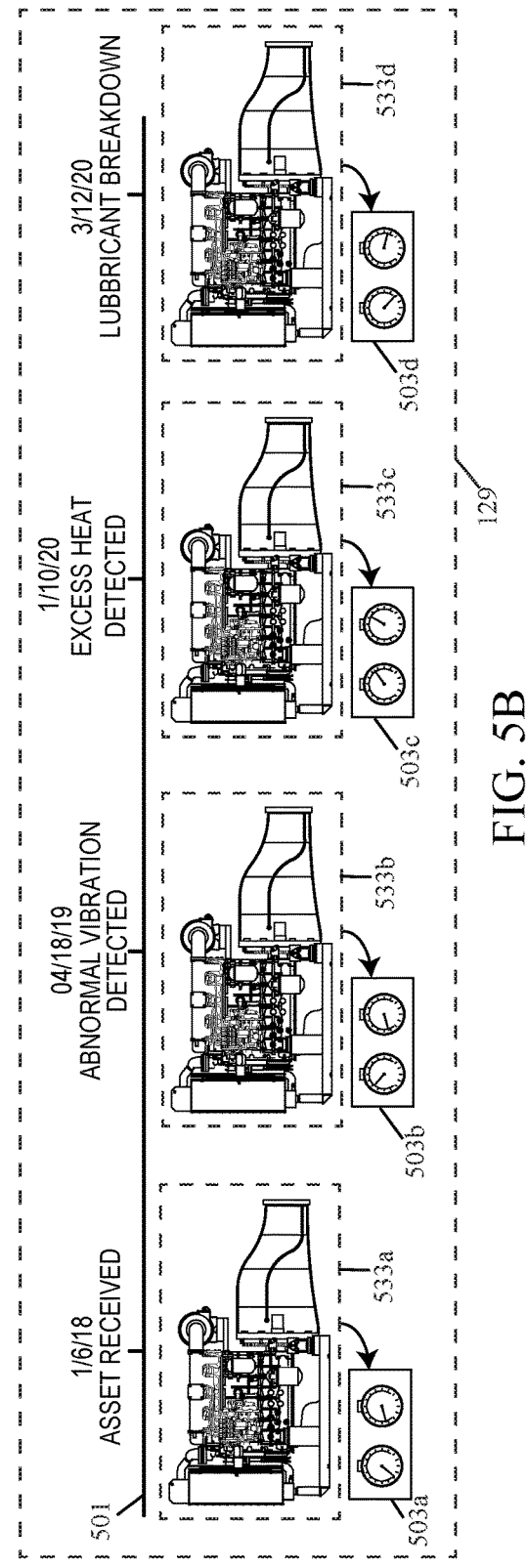
FIG. 5B provides an illustration depicting an embodiment of the digital twin versions of FIG. 5A, further displaying a detailed view of one or more components of each digital twin in the temporal sequence and one or more changes or events reflected by the different digital twin versions.

In some embodiments, the multiple versions of the digital twin models 134 may be sequenced temporally or configured to fit along a time-based scale and/or timeline 501 in order to track the evolution of the physical asset 117 and the subsequent changes. These changes can include changes, replacements, and modifications to the parts, components, and systems, including lubrication systems and lubricants found therein, configurations, settings, operational output, and the surrounding environment (collectively referred to as the "operating environment 533") of physical asset 117. As shown in FIG. 5A-5B, timeline 501 depicts four versions of the physical asset 117 at various points in time and the operating environment 533*a*-533*d* corresponding to the point in time of the versions of digital twin model 134*a*-134*d* being represented. Each point in time is reflected by a new digital twin model 134*a*-134*d* that may be created by the creation engine 105 to catalog the state of the physical asset 117 and the details of the physical asset's 117 operating capabilities and performance, based on the operating environment 533*a*-533*d* as measured by collection devices 119, 121, 123 and represented in the digital twin model 134.

Changes to the digital twin model 134 that may result in the creation of a new version of a digital twin model 134 may be self-reported by users or owners of the physical asset 117 in some instances. For example, a user may perform repairs, maintenance, reconfigure settings, replace lubricant, change lubricant types, and/or install or remove components of the physical asset 117 and report the imposed changes to the digital twin module 103 using the digital twin interface 129. In response to the reported changes, the creation engine 105 may create a new version of the digital twin model 134 to reflect the reported changes to the physical asset 117, including any changes to the operating environment 533, and store the new version of the digital twin model 134 within the digital twin library 133 and/or as part of the timeline 501 tracking the evolution of the physical asset 117. In other instances, embodiments of the digital twin model 134 may be tracked based on changes to performance data, environmental data, and operational data collected by one or more sensor devices 119, IoT devices 121 and/or recording systems 123 monitoring the state of the physical asset 117. Collected data describing the state and operational performance of physical asset 117 may indicate the presence of changes to the physical asset 117, including the breakdown of lubrication between lubricated parts or systems, failing parts, or improper configurations giving rise to increased thermal output, heat, or other detrimental effects on the lubricants present within the physical asset 117.

Based on changes to the collected data being monitored, new digital twin models 134 may be created to reflect a change in the state of the lubricant, a presence of failing parts or components, and/or an increase or decrease in the amount of heat being generated and recorded by sensor devices 119 and thermal images captured by recording systems 123. For instance, data about the physical asset's 117 performance, component configurations (including makes and models of the component), timings or settings of components and parts, an increase or decrease of heat output, increased or decreased levels of friction between components which may be generating the heat (for example due to misalignment), abnormal behavior from parts (for example, increased levels of vibration), the current state and/or viscosity of lubricant in portions of the physical asset 117 with lubricated parts. As the operating conditions of the physical asset 117 change, in particular changes in heat output, increased levels of friction, abnormal output data, changes to parts or components, decreased levels of viscosity in lubricants and lubricated parts, and/or a lubricant state indicative of a breakdown of the lubricant, such a change as detected by the collection devices 119, 121, 123 may be relayed to the digital twin module 103, resulting in the creation of a new version of a digital twin model 134 accurately reflecting the changes in the state of the physical asset 117.

In some embodiments, the presence of new components, configurations, or other changes to the physical asset 117 may be deduced by the performance characteristics, parameters, and operational conditions expressed by the real-time data feed 503a-503d, (referred to generally as real-time data feed 503) comprising data collected by the sensor device(s), IoT device(s) 121, recording system(s) 123 and other data-collecting devices (referred to generally as "collection devices 119, 121, 123") monitoring the physical asset 117 and/or the physical asset's surrounding environment. Deviations between previously collected data (stored as collected datasets 135) and the most recent data sets extracted from the real-time data feed 503, can result in the identification of changes to the physical asset 117 and/or changes in the health of the physical asset 117. For example, changes in performance may indicate the presence of new parts or components, failing or misaligned parts, repairs, modified configurations, software or firmware update, damage, failing lubrication resulting in struggling performance (i.e. due to friction), complete lubrication breakdown, etc. Embodiments of the digital twin module 103 may analyze the performance changes based on the changes in the data collected from the real-time data feed 503 and reflect the changes to the physical asset 117 as a new digital twin model 134 in some embodiments. For instance, by adding a new version of the digital twin model 134 to the digital twin library 133, reflecting the updates, repairs, changes, or performance state of the physical asset 117 as well changes in the generation of heat at various positions within the physical asset 117 and the properties of the lubricant, such as the lubricant's viscosity over time.

An example of modeling changes based on the collected datasets 135 is depicted in FIG. 5A-5B, wherein there is a detected change between the received digital twin model 134a and digital twin model 134b attributed to a noticeable change between the operating environment 533a and 533b, resulting in a difference in the datasets extracted from real-time data feed 503a and 503b. In this particular example, an abnormal vibration detected within the operating environment 533 resulted in an impact on the data being collected from the real-time data feed 503b. As a result of the difference, a new digital twin model 134b was created, the operating environment 533b for the new digital twin model 134b are tracked and a cause of the change in the data of real-time data feed 503b is logged and attributed to the presence of the abnormal vibrations.

In other embodiments, rather than automatically creating a new digital twin model 134 based on changes to the real-time data being extracted from the real-time data feed 503, the digital twin module 103 may alert the user of the detected changes in the collected datasets 135 extracted from the real-time data feed 503, and request updated information from the user about the physical asset 117 to ascertain whether one or more changes to the physical asset 117 are responsible for the observed performance changes. Upon user confirmation of changes to the physical asset 117 or an updated state of the physical asset 117, the creation engine 105 can create a new digital twin model 134 in accordance with the reported changes and store a new digital twin model 134 within the digital twin library 133 and/or add a new version of the digital twin model to a timeline 501 describing the evolution of changes in a physical asset 117.

Embodiments of the digital twin module 103 may comprise a data collection engine 107. The data collection engine 107 may perform the functions, tasks, or operations associated with collecting, extracting, organizing, maintaining, formatting, and/or storing data received from the real-time data feed 503, including data describing the state of the physical asset 117 such as the state of one or more parts and components, the lubricant and/or lubrication system, the surrounding environment and operational environment 533 of the physical asset 117. The data forming collected datasets 135 may be generated by the sensor device(s) 119, IoT device(s) 121, and/or recording system(s) 123 connected to or communicating with the physical asset 117. The collected datasets 135 generated by the sensor device(s) 119, IoT device(s) 121 and/or recording system 123 of the physical asset 217, may be stored in one or more data storage solutions, which may be part of one or more data processing systems 10 onboard the physical asset 117 in some embodiments or separate data processing systems 10 connected to the network 150 in other embodiments.

Embodiments of the data collected by the data collection engine 107 may be captured as a real-time data feed 503 streamed by one or more data collection devices 119, 121, 123 providing the data to the data collection engine 107. In some embodiments, the data collection engine 107, receiving the real-time data feed 503 from the collection devices 119, 121, 123 may extract the data from the real-time data feed 503 streaming to the digital twin system 101 as collected datasets 135. In some embodiments, the data storage maintaining the collected datasets 135 may be distributed to data processing systems 100 positioned as one or more nodes across the network 150. In other embodiments, the collected datasets 135 may be stored locally by the digital twin system 101 (as shown in FIG. 2A) or a networked-connected data storage systems such as repository 131 as reflected in FIG. 2B.

During operation of the physical asset 117, sensor devices 119, IoT devices 121, and recording systems 123 equipped by the physical asset 117 can generate data describing the operation, functionality, and performance of the physical asset 117. The collected datasets 135 that are generated by the collection devices 119, 121, 123, can describe the overall health and performance of the physical asset 117 in its current state (including a state of a lubricant), help diagnose potential maintenance needs, repairs, or failing parts that may need replacement. For example, collection devices 119, 121, 123 may identify and record changes in temperatures within the physical asset 117 over a period of time, identify a presence of an abnormal heat buildup and help diagnose the source of the heat. For instance, sensor devices 119 may show the temperature at various locations within the physical asset 117 including locations of the physical asset 117 that have the highest temperature levels. These heightened temperature levels may be elevated near malfunctioning parts that may be exhibiting abnormal levels of friction. Thermal images recorded by a recording system 123 may confirm the buildup of heat at a particular location and visually depict the changes in the thermal images being collected over time. Additional sensor devices 119 and IoT devices 121 may pinpoint parts and components that may be misaligned, experiencing excess vibration or noise, improperly functioning, broken down, or improperly wearing against one another, causing the abnormal levels of friction and report the abnormal functions as evidenced by the misalignment, excess vibration, noise, friction, or other evidence of improper functionality expressed by the digital twin to the data collection engine 107.

Embodiments of the sensor devices 119, IoT devices 121, and recording systems 123 integrated into the physical asset 117 can also provide errors or diagnostic codes, which may further assist with identifying potential issues, that may alert the user or owner of pending problems with physical asset 117 which may impact the performance of the physical asset 117 and the state of the lubricant and/or lubricated parts. Through the use of the collected datasets 135, organized, analyzed, and/or formatted by the data collection engine 107, the digital twin module 103 may analyze the physical asset's 117 performance, identify failing parts, provide resolutions to cure errors or diagnostic codes and recommend optimal actions to improve or optimize the performance of the physical asset 117, including the replacement of lubricants alongside failing parts and/or regular maintenance schedules which can include regular changes to the lubricants and/or types of lubricants installed within the physical asset 117.

Embodiments of the digital twin module 103 may comprise a knowledge corpus module 109. The knowledge corpus module 109 may perform functions or tasks directed toward managing read and writing operations of knowledge corpus 137 and the plurality of records maintained by the knowledge corpus 137. Embodiments of the knowledge corpus module 109 may create new records in the knowledge corpus 137. For example, creating new records associated with each digital twin model 134 added to the digital twin library 133, a description or log explaining the reasons for the creation of the new digital twin model 134, and the effects on the digital twin based on the collected datasets 135. In some embodiments, the knowledge corpus 137 may also store records of simulation results from one or more simulations performed by the simulation engine 111, described in detail below.

As the data collection engine 107 continuously receives, extracts, and saves the collected datasets 135 and new or updated digital twin models 134 are created, the knowledge corpus module 109 can update the existing knowledge corpus 137 records to reflect and track the changes to the physical asset 117 over time and the reasons for the changes to the physical asset 117 being reflected in digital twin models 134. For example, the events describing a physical asset 117 as represented by the digital twin models 134a-134d in FIG. 5A-5B may be tracked and inputted into the records of the knowledge corpus 137 by knowledge corpus module 109. As the physical asset 117 evolves, and changes over time (i.e. from Jan. 16, 2018 to Mar. 12, 2020 as shown in FIG. 5A) the records of the knowledge corpus evolve, change or update with the changes to the digital twin models 134a-134d in order to learn how certain actions and events impact the performance and operation of the physical asset 117.

One or more modules and/or engines of the digital twin module 103 may be part of an artificial intelligence system predicting the possible causes of lubricant breakdown over time using one or more simulations performed by simulation engine 111. For example by simulating the generation of heat in different parts of components located in various positions throughout the physical asset 117, tracking the heat generation and location thereof using one or more sensor devices 119, IoT devices 121 and/or recording systems 123, such as a thermal imaging camera and feeding the simulation results to the knowledge corpus 137. Embodiments of the knowledge corpus 137 may ingest the simulation data alongside the collected datasets 135 and predict possible causes of lubricant damage and breakdown over time, classify the breaking patterns for the lubricants, identify and/or prioritize lubricant replacements versus maintenance or replacement of parts acting as the underlying cause of the lubricant breakage.

For instance, using FIG. 5A-5B as an example, on Apr. 18, 2019, when abnormal vibrations are detected in operating environment 533b of the physical asset 117 associated with digital twin model 134b, the records of the knowledge corpus 137 can be updated to include the presence of the abnormal vibration, collected datasets 135 providing evidence of the abnormal vibration as well as other data collected as part of real-time data feed 503b that may be relevant to the identified issue. Subsequently, at Jan. 10, 2020 when digital twin model 134c was created and excess heat is detected in operating environment 533c, additional records of the knowledge corpus 137 and/or updated records may be added to the knowledge corpus 137 by the knowledge corpus module 109, describing the identified issue and/or resolution of the issue. For example, the knowledge corpus 137 may be updated to include the source of the heat, such as excess friction being created between two lubricated parts, which may or may not be attributed to the abnormal vibrations, misaligned parts, or a new cause contributing to the heat. Any resolving actions that may be implemented, such as replacement of the parts causing the excess friction and/or replacement of lubricants may be logged in the knowledge corpus 137, in order to help the digital twin system 101 learn about the impact of the actions being taken to resolve the various events logged by the knowledge corpus module 109 (whether the results are positive or negative). For example, a replacement of parts that may occur at the excess heat event logged on Jan. 10, 2020 may be added to the knowledge corpus 137, and at a later point in time, the abnormal vibration re-occurs, and the excess heat is detected soon thereafter. Each resolving action is logged in the knowledge corpus 137. Likewise, where not only are replacement parts applied, but a lubricant is replaced as well, if the results of changing the parts and the lubricant yields better results than changing the parts alone, the knowledge corpus 137 may better inform the user of the more successful actions to take with regards to the physical asset 117, if such abnormal vibrations and/or excess heat events arise again, on either the current physical asset 117 or another substantially similar physical asset that may be contributing to and/or has access to the knowledge corpus 137. The feedback mechanism of recording subsequent events with the knowledge corpus 137 allows the knowledge corpus to improve recommendations and realize more accurate simulations.

Embodiments of the knowledge corpus module 109 and/ or knowledge corpus 137 may be a software application separate from the digital twin module 103, integrated into the digital twin module 103, or a standalone set of tools which may be stored directly on the persistent storage 16 of either the digital twin system 101, or host system 201. In other embodiments, the knowledge corpus module 109 and knowledge corpus may be accessed remotely by the digital twin module 103 or host system 201 over network 150. For example, by installing the knowledge corpus 137 on a network-accessible repository 131 or remotely accessible data processing system 10. The term "knowledge corpus 137" may refer to a human-readable or machine-readable resource for disseminating and optimizing information collection, organization, and retrieval. The knowledge corpus 137 may draw upon the knowledge of humans and artificial intelligence that has been inputted into the knowledge corpus 137 in a machine-readable form and may be structured as a database. For example, input via the knowledge corpus module 109. Embodiments of the knowledge corpus 137 may be used to find solutions to current and future problems by using the data inputted into the knowledge corpus 137 from past experiences to make informed decisions and/or recommendations to a user or administrator of the digital twin system 101, host system 201 and/or digital twin module 103.

Embodiments of the knowledge corpus 137 may not be simply a static collection of information. Rather, the knowledge corpus 137 may be a dynamic resource having the cognitive capacity for self-learning, using one or more data modeling techniques and/or by working in conjunction with one or more machine learning programs and predictive modeling algorithms of the knowledge corpus module 109 to improve the accuracy of predicting and presenting actions suitable for predicting lubricant breakdown, optimizing lubricants in a physical asset 117, determining optimal timing for replacing a lubricant and the ontology modeled using the collected datasets 135, digital twin models 134, and/or simulation results of one or more simulations conducted by the simulation engine 111. Embodiments of the knowledge corpus 137 may apply problem-solving logic and use one or more problem-solving methods to provide a justification for conclusions reached using the knowledge corpus 137 when recommending the actions being compiled into a report about maximizing the lifespan of lubricants within a physical asset 117 and/or timing for replacing lubricants within the physical asset 117.

The exemplary embodiment of knowledge corpus 137 may be a machine-readable knowledge corpus 137 that may receive, and store information inputted into the knowledge corpus 137 as one or more database records by the knowledge corpus module 109. The content of each record may include the identification of the physical asset 117, a log describing an event associated with the physical asset 117 or a digital twin model 134, collected datasets 135 associated with the event being logged, historical data collected from one or more historical data source 141 associated with the physical asset 117 including information and data about lubricants and lubricant properties, simulation data provided by a simulation engine 111, one or more actions to resolve the event identified and outcomes as a result of the applied resolution to resolve the event. Each of the records and associated data collected as a result of the event may be maintained by the knowledge corpus 137 for future reference, comparison, and predictions, including for the purposes of performing predictive simulations by simulation engine 111. Each time the digital twin module 103 is used by one or more users, additional records may be created or stored to the knowledge corpus 137, allowing for the knowledge corpus 137 to learn from each event occurring and the additional data being stored to the knowledge corpus 137. In other words, a knowledge corpus 137 may be shared knowledge by multiple users and may be used to apply solutions for many similar types of physical assets 117 or a wide range of different physical assets 117 in order to provide guidance to subsequent users based on a comparison between a user's own physical asset's 117 parameters and the similar parameters of other physical assets 117 that may have experienced similar events and situations.

Embodiments of a knowledge corpus 137 may comprise a plurality of components to operate and make decisions that may be useful to users of the digital twin module 103 for requesting and receiving recommended procedures for maximizing a lubricant lifespan and/or timing for replacing a lubricant within a physical asset 117. Embodiments of the knowledge corpus 137 and/or knowledge corpus module 109, may include components such as a fact database, rules engine, a reasoning engine, a justification mechanism, and a knowledge acquisition mechanism. The facts database may describe a current fact pattern surrounding a particular user seeking recommendations or predictions about the lubricants of the physical asset 117 using digital twin module 103.

Embodiments of the rules engine may be a set of universally applicable rules that may be created based on the experience and knowledge of the practices of experts, developers, programmers, and/or contributors to the knowledge corpus 137. The rules created by the rules engine may be generally articulated in the form of if-then statements or in a format that may be converted to an if-then statement. The rules of the knowledge corpus 137 may be fixed in such a manner that the rules may be relevant to all or nearly all situations covered by the knowledge corpus 137. While not all rules may be applicable to every situation or user being analyzed by the knowledge corpus 137 where a rule is applicable, the rule may be universally applicable.

Embodiments of the reasoning engine may provide a machine-based line of reasoning for solving problems, such as deciding an optimal timing for replacing lubricant of a physical asset 117 and/or one or more actions for maximizing the lifespan of the lubricant. The reasoning engine may process the facts in the fact database and the rules of the knowledge corpus 137. In some embodiments the reasoning engine may also include an inference engine that may take existing information in the knowledge corpus 137 and the fact database, then use both sets of information to reach one or more conclusions and either implement an action or recommend an action to a user. Embodiments of the inference engine may derive new facts from the existing facts of the facts database using rules and principles of logic.

Embodiments of the justification mechanism of the knowledge corpus 137 may explain and/or justify how a conclusion by the knowledge corpus 137 was reached. The justification mechanism may describe the facts and rules that were used to reach the conclusion. For example, justify how the timing for replacing a lubricant is reached and/or how particular actions that maximize the lifespan of the lubricant were identified. Embodiments of the justification mechanism may be the result of processing facts describing a current user in accordance with the entries of the knowledge corpus 137, the reasoning engine, the rules, and the inferences drawn by the knowledge corpus 137. The knowledge acquisition mechanism of the knowledge corpus 137 may be performed by manual creation of the rules, a machine-based process for generating rules, or a combination thereof.

Embodiments of the knowledge corpus 137 may determine which actions performed by the user may maximize the lifespan of a lubricant within a physical asset 117 and/or determine an optimal interval of time to replace the lubricant, through the use of one or more machine learning techniques. The machine learning techniques may use collected datasets 135, simulation results, historical data collected from historical data sources 141, changes to digital twin models 134 and results of the changes, to arrive at one or more recommendations, suggestions, and/or conclusions that will be presented to the user to maximize lubricant life in the physical asset 117, and/or the optimal timing for periodically replacing lubricants. Embodiments of the knowledge corpus 137 may arrive at such recommendations, suggestions, and/or conclusions using supervised learning, unsupervised learning, and/or semi-supervised learning techniques.

Supervised learning may refer to a type of machine learning that may use one or more computer algorithms to train the knowledge corpus 137 using labeled examples during a training phase. The term "labeled example" may refer to the fact that during the training phase, there are desired inputs that will produce a known desired output by the knowledge corpus 137. The algorithm(s) of the knowledge corpus 137 may be trained by receiving a set of inputs along with the corresponding correct outputs. To employ supervised learning, the knowledge corpus 137 may store a labeled dataset for learning, a dataset for testing and a final dataset from which the knowledge corpus 137 may use for the one or more recommendations, actions, conclusions, or suggestions regarding the lubricants and/or lubricant systems of the physical asset, including not only the timing for replacing the lubricant but may also include recommended actions that may prolong the life of the lubricant within the physical asset, for example, suggested repairs or replacements of parts that may be wearing out, broken or misaligned, maintenance schedules, timings, settings and configurations of the physical asset when operating under particular environmental conditions. For instance, adjusting timings, configurations, or settings when the physical asset 117 operates under heavy workloads, dusty or humid conditions, etc., to compensate for the stressors placed on the physical asset 117 by the changes in the environmental conditions during operation.

Embodiments of the supervised machine learning algorithms may learn by comparing the actual output with the correct outputs in order to find errors. The knowledge corpus 137 may modify the model of data according to the correct outputs to refine the decision making of the knowledge corpus 137, improving the accuracy of the automated decision making of the knowledge corpus 137 to provide the correct inputs to the knowledge corpus module 109 and/or the reporting engine 113. During the training phase, the knowledge corpus 137 may learn the correct outputs by analyzing and describing well known historical data, collected datasets 135 and simulation results that may be stored by the knowledge corpus 137. Examples of data modeling include classification, regression, prediction and gradient boosting. Under a supervised learning technique, the knowledge corpus 137 may be trained using historical data and/or collected datasets 135 describing the physical asset's operating condition, properties of the lubricants, the amounts of lubricants present in the physical asset 117, historical lubricant performance and breakage points, operational environments, environmental parameters, the overall health of the physical asset 117 including historical effects of damaged, misaligned or worn parts on the lubricant's properties.

Unsupervised learning techniques on the other hand may be used when there may be a lack of historical data describing the physical asset 117, digital twin models 134 of the physical asset and each of the parts, components, lubricants and/or actions previously performed on the physical asset as well as the results of performing such actions. Machine learning that is unsupervised may not be "told" the right answer the way supervised learning algorithms do. Instead, during unsupervised learning, the algorithm may explore the data to identify common attributes and patterns between collected datasets 135, actions such as repairs, maintenance, wear and tear on parts, misalignments and other events that may impact the lubricant performance and life, then draw conclusions based on the common attributes and patterns being observed. Examples of unsupervised machine learning may include self-organizing maps, nearest-neighbor mapping, k-means clustering, and singular value decomposition.

Embodiments of the knowledge corpus 137 may incorporate semi-supervised learning techniques. Semi-supervised learning may be used for the same applications as supervised learning. However, instead of using entirely labeled training examples during the training phase, there may be a mix of labeled and unlabeled examples during the training phase. For example, there is a small or limited amount of labeled data being used as examples (i.e., limited amounts of historical data) alongside a larger amount of unlabeled data that is presented to the knowledge corpus 137 during the training phase. Suitable types of machine learning techniques that may use semi-supervised learning may include classification, regression and prediction models.

Embodiments of the digital twin module 103 may further use the collected datasets 135 and historical data from historical data sources 141 to aid in the performance of one or more simulations that may simulate physical asset 117 performance within the digital twin models 134 or provide simulations using various scenarios of the digital twin models 134 to predict the breakdown of lubricants and/or optimal timings for changing lubricants before breakdown occurs. For example, simulations predicting effects of replacing particular parts, introducing new types of lubricants, adjusting timings, modifying onboard electrical or computing components, replacing or realigning misaligned parts, and even replacing potentially defective sensor devices 119, IoT devices 121, recording systems 123. Collected datasets 135 collected by the data collection engine 107, historical data retrieved by the digital twin module 103 and/or the knowledge corpus module 109 accessing the knowledge corpus 137, may contribute to building one or more simulation models that may be used by the simulation engine 111. In some embodiments, manufacturers and/or users of the physical asset 117 may share the collected datasets 135 amongst owners of the same type of physical asset 117 or base asset, to improve modeling that uses the data, increasing the overall amounts of data available amongst the community of owners, thus improving the prediction models and creating improved simulation results when predicting the effects of one or more actions and environments on the breakdown of lubricants. For example, collected datasets 135 may be shared with the physical asset's 117 manufacturers and in turn, performance data collected by the manufacturer's customers for a particular type of physical asset 117 may be aggregated into predictive models and shared amongst the manufacturer's customers, if the user of the physical asset 117 elects to participate in the sharing program.

Embodiments of the digital twin module 103 may comprise a simulation engine 111. Embodiments of the simulation engine 111 may perform simulations of physical asset 117 operations using one or more digital twin models 134 to predict the performance of the physical asset 117 in a future state, using a current state, a previous state, and/or in a hypothetical configuration of the physical asset, represented by one or more digital twin models 134. Simulations performed by the simulation engine 111 may execute simulations using one or more input parameters corresponding to one or more selected digital twin models of digital library 133, as well as collected datasets 135 for each digital twin model aggregated by the data collection engine 107 from one or more sensor devices 119, IoT devices 121 and recording systems 123 connected to the physical asset 117 and/or historical data collected from one or more historical data sources 141.

Embodiments of the simulation engine 111 may perform digital twin simulations of the physical asset 117 using one or more versions of the digital twin models 134 created and stored by the digital twin library 133, as part of the timeline 501, describing the evolution of the physical asset 117. For instance, in the embodiment depicted in FIG. 5A-5B, a simulation may be performed using the most current digital twin model 134d, a previous version of a digital twin model 134a-c and/or a digital twin model 134a describing the base asset form of the physical asset 117, when the physical asset was first provided to the user.

As shown in FIG. 6A-6D, a simulation engine 111 may perform a plurality of simulations of one or more operating environments 533 of one or more digital twin models 134, the collected datasets 135, and historical data to generate simulated timelines 601a-601d predicting future events based on one or more simulated actions being performed by the simulation engine 111. For example, as shown in FIG. 6A-6D, the simulation engine 111 may be generating one or more simulated timelines 601a-601d to determine the effects of one or more actions on a lubricant, taking into account the properties of lubricants that may be optimized for particular operating conditions 533, how to maximize the longevity of a lubricant based one or more actions and events that may occur as a result of using a physical asset 117 as well as predict optimal timing for replacing a lubricant, in order to prevent or avoid lubrication breakdown during the use of the physical asset 117. In an exemplary embodiment, the simulation engine 111 may create a simulated timeline 601 comprising digital twin models 134 based on thermal imaging of the physical asset 117, wherein each simulated digital twin model 134 being generated as part of the simulation predicts the future generation of heat based on the current state of the lubricant, the operational conditions and environmental conditions of the physical asset 117, up to and including a point at which the physical asset 117 may be predicted to break and/or the performance of the physical asset is reduced. Embodiments of the simulation engine's 111 predictions may further depict portions of the physical asset 117 utilizing the lubricant, how much lubricant is being used and the devolution of the lubricant over time as the lubricant breaks down as a result of one or more events or actions presented in the simulation.

FIG. 6A-6D depicts a simplified example of simulated events that may be performed by the simulation engine 111 and one or more outputs of the simulation engine 111 that may be plotted onto a simulated timeline 601 that is visualizing the one or more events and/or actions of the simulation, simulated operating environments 533e-533s and simulated data feeds 603e-603s corresponding one or more of the simulated operating environments 533e-533s. A person skilled in the art would understand that the examples depicted by FIG. 6A-6D are simplified and that a simulation engine 111 may be capable of performing dozens, hundreds, thousands or more simulations of events per simulated timeline 601 and/or dozens, hundreds, thousands, or more different simulated timelines 601 comprising different sets of events or actions. As shown in the example of FIG. 6A-6D, the simulation engine 111 is predicting a timing for lubrication breakdown to occur in a physical asset 117, actions and/or events that may impact the length of time a lubricant may last before breaking down, as well as predicted effects of the one or more actions and/or events on the physical asset 117.

Figure 6A:
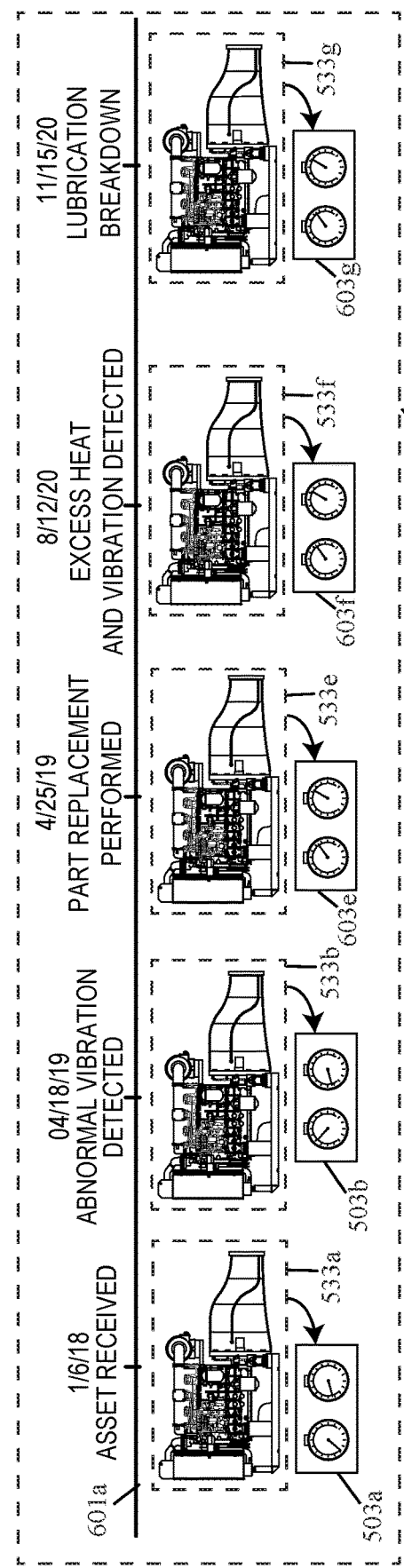
FIG. 6A depicts an embodiment of a simulated temporal sequence describing a projected series of events reflected by a digital twin and one or more predicted effects on the components and/or systems represented by the digital twin.

For example, in the simulated timeline 601a, the simulation engine 111 predicts the impact of one or more events and actions on the lubricant of physical asset 117 into a hypothetical future occurring beyond the detection of an abnormal vibration being detected in operating environment 533b, corresponding to digital twin model 134b. As shown, following the detection of an abnormal vibration in the physical asset, for example, through the use of one or more data collection devices 119, 121, 123 via real-time data feed 503b. Embodiments of the simulation engine 111 may simulate the action or event on 4/25/19 directed toward simulating the effects of replacing one or more parts or components of the operating environment 533e and record the results as reflected in the simulated data feed 603e from replacing parts or components that are determined to be contributing to the abnormal vibrations previously detected in operating environment 533b. The predictions of the simulation engine 111 may be determined based on the information and record compiled by the knowledge corpus 137 to predict the outcomes in the simulations. For instance, by analyzing previously similar events or actions and using records of previous similar events to simulate the results of simulated timelines 601. As shown in FIG. 6A, the simulated timeline 601a continues to simulate the impact of the replacement of the parts and components on the operating environment of a simulated digital twin model, and in particular, simulating the effects on the lubricants. In the embodiment of the simulated timeline 601a, the simulation engine 111 predicts that merely replacing the parts detected to cause the abnormal vibration may only be a temporary measure and following the part replacement, another vibration is determined to occur, along with excess heat, as predicted to be measured by one or more data collection devices 119, 121, 123 and observed by the simulated data feed 603f. For example, the previous replacement of parts alone did not fix the underlying issues of the physical asset 117 in this simulation, and instead, the parts wore out again, for instance, due to becoming misaligned over time resulting in excess friction as detected through heat identified using one or more heat sensors and/or thermal imaging of a recording system 123. This simulated timeline 601a is shown to ultimately lead to a prediction of lubricant breakdown by a predicted date of Nov. 15, 2020.

Figure 6B:
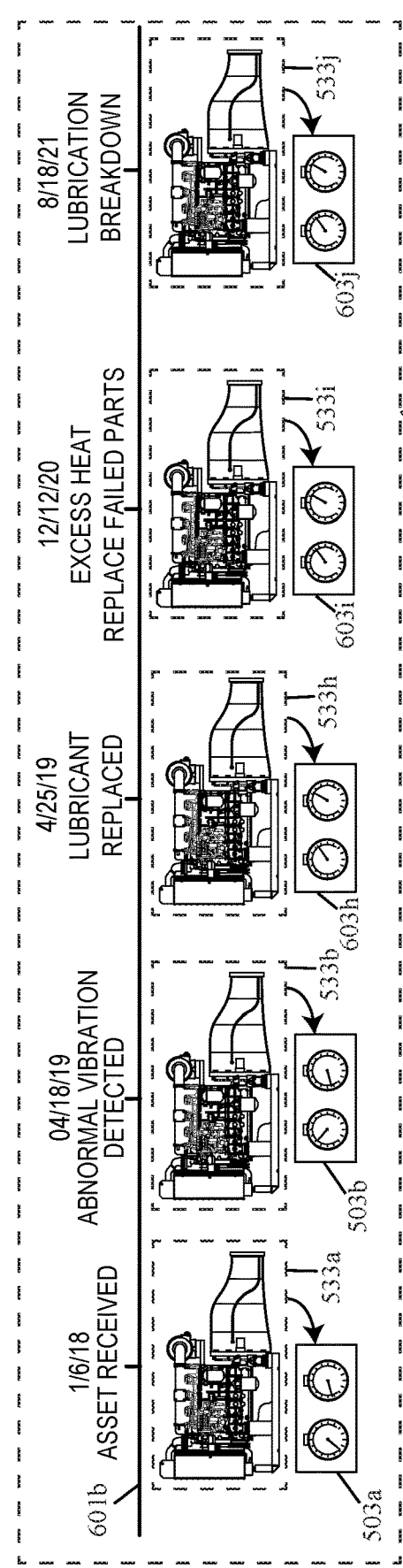
FIG. 6B depicts an embodiment of a simulated temporal sequence describing an alternative projected series of events reflected by a digital twin and one or more predicted effects on the components and/or systems represented by the digital twin.

In FIG. 6B, an alternative simulated timeline 601b is depicted showing different effects on the lubricants of physical asset 117 due to an alternative set of events occurring in response to one or more actions that may differ from simulated timeline 601a. In simulated timeline 601b, an action is shown that replaces the lubricant of the physical asset shortly after the detection of the abnormal vibration in the operating environment 533b of physical asset 117. Subsequently, excess heat is detected by one or more data collection devices 119, 121, 123 of the simulation and the parts that were previously replaced in simulated timeline 601a, ultimately fail and require replacement in the simulated operating environment 533i. Accordingly, as shown by the simulated timeline 601b, the simulation engine 111 predicts that even upon replacing the failed parts after detecting the excess heat from the failed parts, the lubricant breaks down shortly thereafter. Comparing simulated timeline 601a to simulated timeline 601b, the results of the simulation may indicate to the knowledge corpus 137 that between these two simulations, the lubricant may last longer before breaking down if the lubricant is replaced at the detection of the abnormal vibration compared with simply replacing the parts that may be contributing to the abnormal vibration. However, as shown by other simulations, the simulated timeline 601b may not be considered an optimal solution when compared with other simulated timelines 601.

Figure 6C:
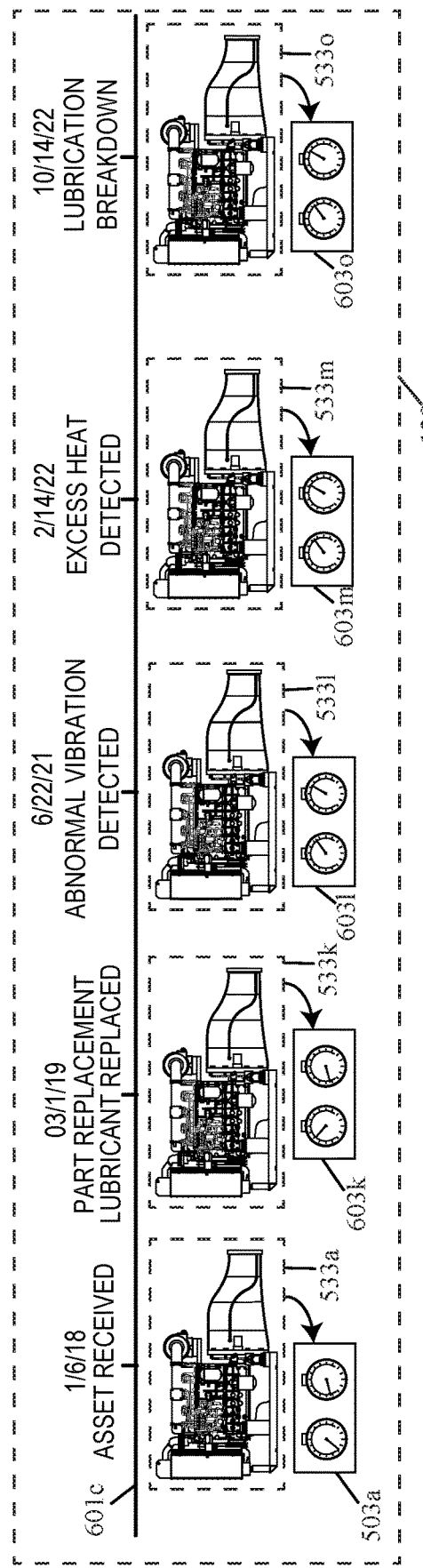
FIG. 6C depicts an embodiment of a simulated temporal sequence describing a second alternative projected series of events reflected by a digital twin and one or more alternative predicted effects on the components and/or systems represented by the digital twin.

In FIG. 6C, a third simulated timeline 601c is depicted. As shown in this example, the simulated timeline 601c calculated by the simulation engine 111 comprises a set of actions and/or events that differ (at least in part) from the simulated timelines 601a and 601b. As shown in FIG. 6C, the simulation engine 111 proceeds to simulate the effects of actions and/or events on operation environment 533a of the digital twin model 134a of the physical asset 117 as originally received. In the simulation of the simulated timeline 601c, instead of reacting to the detection of the abnormal vibration, the simulation engine 111 in this particular example, simulates a predicted outcome wherein preventative actions are taken before the abnormal vibration occurs. In this case, replacing one or more parts or components is predicted to be the cause of the abnormal vibration and/or excess heat, along with replacing the lubricant at the time the replacement parts are installed. As predicted by the simulation, proactively replacing the parts and lubricant before the occurrence of the abnormal vibration prevents the occurrence of the vibration and ultimately prolongs the breakdown of the lubricant for about a year longer than simulated timeline 601b and nearly two years longer lubricant life than simulated timeline 601a.

Figure 6D:
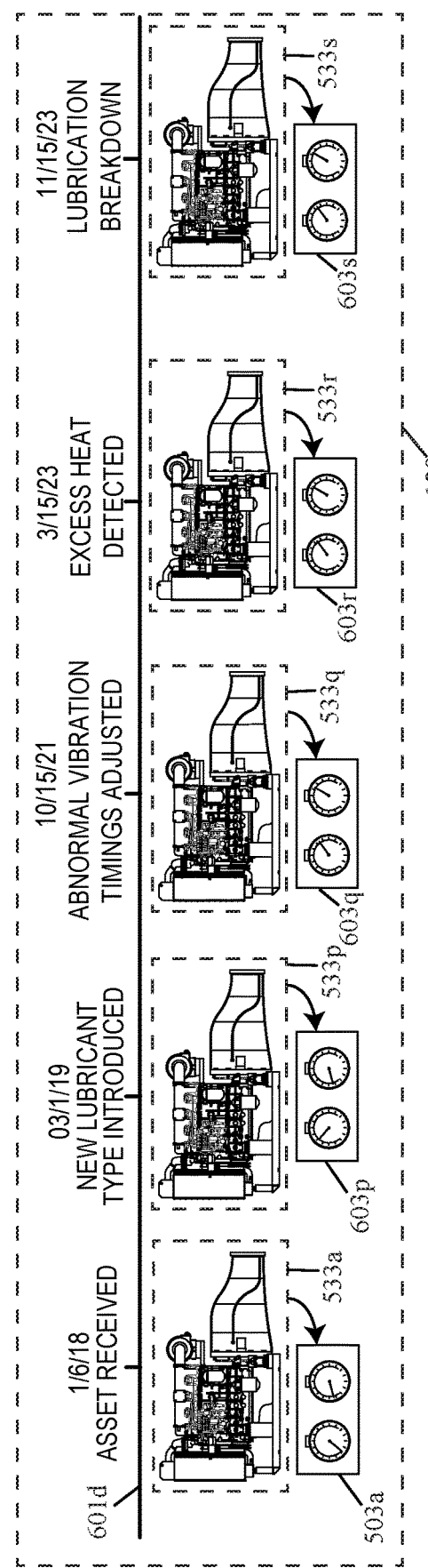
FIG. 6D depicts an embodiment of a simulated temporal sequence describing a third alternative projected series of events reflected by a digital twin and one or more predicted effects on the components and/or systems represented by the digital twin.

FIG. 6D depicts an example of a fourth simulated timeline 601d predicted by the simulation engine 111. As shown, the fourth simulated timeline 601d comprises one or more simulated events or actions that predict lubrication breakdown using one or more different events or actions from those actions or events simulated in simulated timelines 601a-601c. As shown in simulation timeline 601d, the effects of introducing a new type of lubricant with one or more different properties are simulated by the simulation engine 111. As shown in the simulation timeline 601d, the simulation engine 111 predicts that by introducing the new lubricant into the operating environment 533p before the occurrence of the abnormal vibrations and/or heat is detected in other simulated timelines. The newly introduced lubricant is not only predicted to improve the length of time before lubrication breakdown compared with the simulated timelines 601a-601c but is predicted to have an increased lubricant life, even without replacement of parts or components, as performed in the previous simulated timelines 601a-601c. Likewise, although an abnormal vibration is detected in simulated timeline 601d, a different action is taken besides replacing the parts. Rather, adjusting the timings of the operating environment 533q is performed. This may be due to the fact that the new lubricant with improved properties protects against the wear and misalignment of the parts that were previously wearing out and generating heat. While ultimately excess heat is detected and lubrication breakdown is identified, the superiority of the new lubricant with improved properties may be identified by the simulation results and the timings for optimizing the replacement of the new lubricant may also be identified.

Embodiments of the simulation engine 111 may forward the results of the plurality of simulations performed along with one or more simulated timelines 601 providing a temporal sequence of simulated events and actions to the knowledge corpus module 109, which may write the simulation results to one or more records of the knowledge corpus 137. Based on the simulation results, the collected datasets 135, historical data and/or other stored records of the knowledge corpus 137, the knowledge corpus may render one or more recommendations to a user. For example, based on the simulated timelines 601a-601d, the knowledge corpus may determine that based on the environments that the physical asset 117 is operating in, replacing the current lubricant of the physical asset 117 with a new type of lubricant having improved properties may prevent degradation to the physical asset 117 over the existing lubricant, reduce the amount wear and tear on existing components and increase the amount of time between replacing the lubricants of the physical asset, in order to avoid lubrication breakdown. Moreover, the knowledge corpus 137 may further recommend, based on the simulations of the simulation engine 111, an optimal timing for replacing the lubricant in the physical asset 117 if the original lubricant is maintained, if a user decides not to switch over to the new, improved lubricant from the simulated timeline 601d, as well as recommended maintenance schedule for removing, replacing, repairing and/or realigning parts and components at each of the recommended times for replacing the lubricant, in order to prevent lubrication breakdown and/or prolong the lifespan of the existing lubricant that is being used.

In some embodiments, users may customize a starting digital twin model to use for performing one or more simulations with the simulation engine 111. For example, a user may customize the digital twin model 134 to use during a simulation, from a plurality of existing digital twin models 134 that may be available and/or stored in the digital twin library 133, and/or part of the time-based scale describing the versions of the digital twin models on timeline 501. For example, prior to the execution of the simulation by the simulation engine 111, the user can select a version of the digital twin model 134 and modify the digital model 134 by replacing one or more components or configurations to simulate the results that could occur by making such replacements or configurations to the physical asset 117 and the effects thereof on the lubricants, lubricant systems and/or the lubricated parts and components of the physical asset 117. For example, a user selects a digital twin model 134 representing the physical asset 117 in the physical asset's current state and rather than simulating the current state of the physical asset 117, the user substitutes the current motor equipped in the physical asset 117 with a new motor being considered to replace the current motor by the user. The new motor being considered can be substituted in the selected digital twin model 134 and the simulation may provide simulation results predicting the impact of replacing the current motor of the physical asset with the new motor selected by the user.

Embodiments of the digital twin module 103 may comprise a reporting engine 113. Embodiments of the reporting engine 113 may perform functions or tasks of the digital twin module 103 which may be directed toward receiving simulation results from the simulation engine 111, transmitting the simulation results to one or more client systems 127 and displaying the simulation results on the digital twin interface 129. In some embodiments of the reporting engine 113, the reporting engine 113 may save and archive the simulation results to the digital twin library 133 of repository 231. Users of the digital twin module 103 may request the reporting engine 113 to retrieve archived simulation results from previous simulations and view the archived simulation results on the digital twin interface 129. Embodiments of the reporting engine 113 may also be capable of accessing and providing to the user one or more available publicly shared simulation results from owners and users of similar physical assets 117. In some embodiments, the reporting engine 113 may receive the recommendations provided by the knowledge corpus 137 via the knowledge corpus module 109, including recommendations directed toward prolonging the life of a lubricant, replacement of lubricants, timing for changing lubricants as well as one or more actions that may accompany recommendations for optimizing the lubricant systems of the physical asset 117. For example, recommendations for implementing a particular maintenance schedule, repairs, replacements, settings, software updates, configurations, timings or other changes to the physical asset 117 alongside the recommendations for the lubricants. Embodiments of the reporting engine 113 may transmit the recommendations of the knowledge corpus 137 over the network 150 for display on the digital twin interface 129 of client system 127. In some embodiments, a user of the client system 127 may accept the one or more recommendations via the digital twin interface 129 and choose to create reminders for implementing the recommendations, schedule the recommended actions to be implemented on the physical asset 117 and/or manually report to the digital twin module 103 when the recommended actions are performed.

Accordingly, as the recommendations are implemented on the physical asset 117, the recommended actions may be reflected in a digital twin model 134 and feedback in the form of collected datasets 135 may be received by the data collection engine 107, indicating the impact of the recommended actions on the physical asset 117. The feedback of the collected datasets 135 may provide additional insight into the performance of the physical asset over time, including the performance of the lubricated parts, lubricant systems over time. As such, the feedback provided by the data over time can help improve the simulation results and increase the accuracy of the predictions provided by the knowledge corpus 137.

Figure 2B:
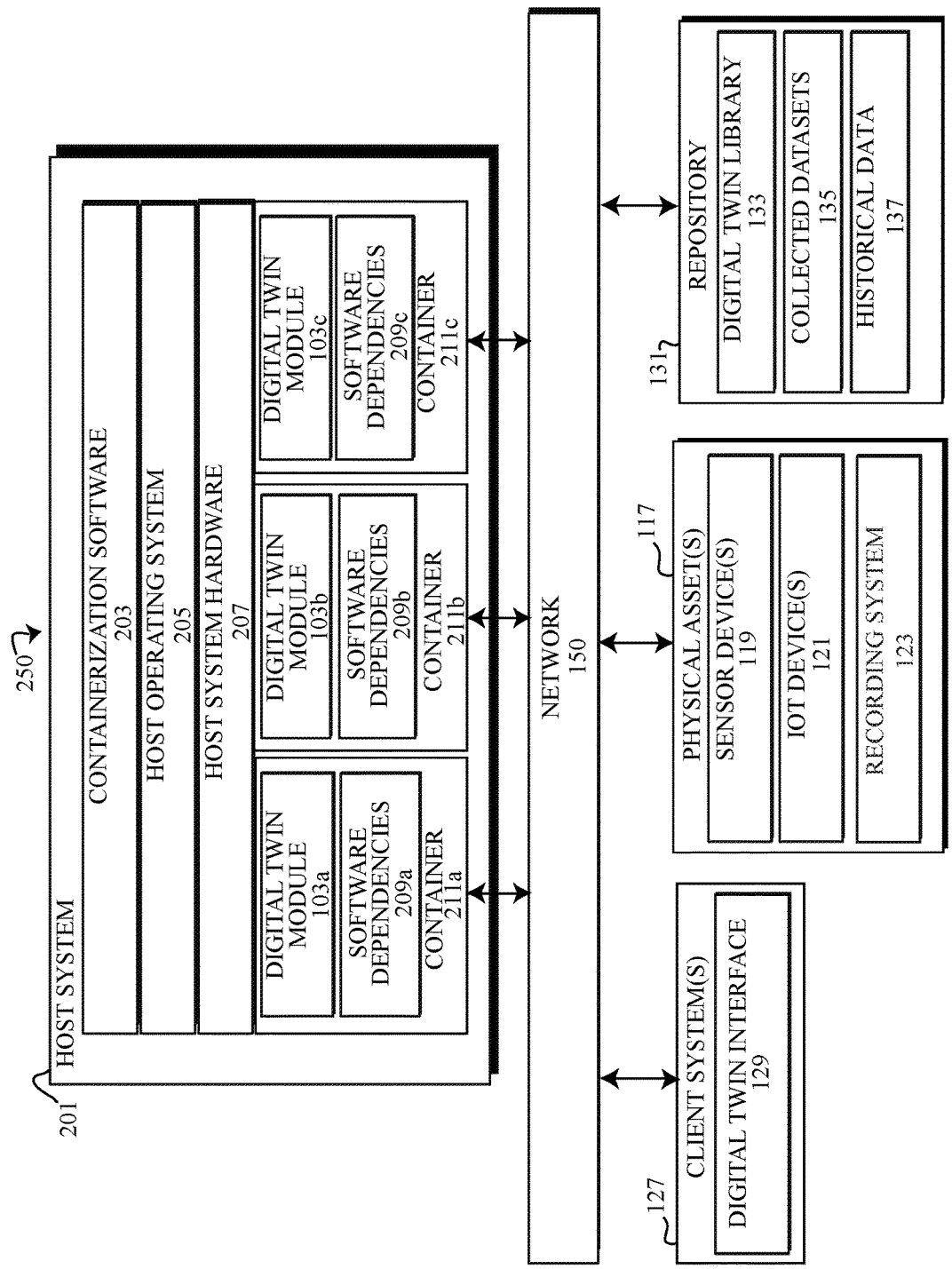
FIG. 2B depicts a block diagram of an alternate embodiment of a computing environment for creating, modeling, and/or simulating a digital twin, in accordance with the present disclosure.

Referring to the drawings, FIG. 2B depicts an alternative embodiment, comprising computing environment 250, wherein host system 201 containerizes the digital twin module 103 into multiple container environments (depicted as container 211a-211c), containing a different workload of the digital twin module 103a-103c and their associated software dependencies 209a-209c, within the container's operating environment. The host system 201 may run a multi-user operating system (i.e. the host operating system 205) and provide computing resources via the host system hardware 207 to one or more containers 211a-211c (referred to generally as containers 211) comprising the containerized computer environment 250 for the digital twin module 103 to execute and perform one or more functions of the digital twin module 103.

Embodiments of computing environment 250 may be organized into a plurality of data centers that may span multiple networks, domains, and/or geolocations. The data centers may reside at physical locations in some embodiments, while in other embodiments, the data centers may comprise a plurality of host systems 201 distributed across a cloud network and/or a combination of physically localized and distributed host systems 201. Data centers may include one or more host systems 201, providing host system hardware 207, a host operating system 205 and/or containerization software 203 such as, but not limited to, the open-source Docker and/or OpenShift software, to execute and run the containerized digital twin module 103 encapsulated within the environment of the containers 211, as shown in FIG. 2B. Although the exemplary embodiment depicted in FIG. 2B includes three containers 211a-211c, the embodiment of FIG. 2B is merely illustrative of the concept that a plurality of containers 211 can be hosted by a host system 201. The embodiment of FIG. 2B should in no way be considered to imply that the host systems 201 is limited to hosting only three containers 211. The number of containers 211 hosted by a host system 201 may vary depending on the amount of computing resources available, based on the host system hardware 207 and the amount of computing resources required by individual digital twin modules 103 being executed within the containers 211 by the containerization software 203.

Embodiments of the containerization software 203 may operate as a software platform for developing, delivering, and running containerized programs and applications, as well as allowing for the deployment of code quickly within the computing environment of the containers 211. Embodiments of containers 211 can be transferred between host systems 201 as well as between different data centers that may be operating in different geolocations, allowing for the containers 211 to run on any host system 201 running containerization software 203. The containerization software 203 enables the host system 201 to separate the containerized applications and programs, such as the containerized digital twin module 103 from the host system hardware 207 and other infrastructure of the host system 201. For example, host system hardware 207 may include one or more processor(s) 13, memory 15, persistent storage 16, cache 17, communications unit 11, communication fabric 12, I/O interface(s) 20, human-readable displays 18 and/or external device(s) 19. The containerization software 203 provides host system 201 with the ability to package and run digital twin module 103 within the isolated environment of the container 211. Isolation and security provided by individual containers 211 may allow the host system 201 to run multiple instances of digital twin module 103 simultaneously on a single host system 201. A container 211 may be lightweight due to the elimination of any need for a hypervisor, typically used by virtual machines. Rather, the containers 211 can run directly within the kernel of the host operating system 205. However, embodiments of digital twin module 103 may benefit from combining virtualization of virtual machines with containerization. For example, the host system 201 may be a virtual machine running containerization software 203.

Embodiments of the containerization software 203 may comprise a containerization engine (not shown). The containerization engine may be a client-server application which may comprise a server program running a daemon process, a REST API specifying one or more interfaces that the digital twin module 103 and/or other programs may use to talk to the daemon process and provide instructions to the digital twin module 103, as well as a command-line interface (CLI) client for inputting instructions. In one embodiment, the client system 127 may input commands using a CLI to communicate with the containerization software 203 of the host system 201. In the exemplary embodiment depicted in FIG. 2B commands provided by the client system 127 to the host system 201 may be input via the digital twin interface 129 loaded into the memory 15 or persistent storage 16 of the client system 127 interfacing with the host system 201.

Embodiments of the CLI may use the REST API of the containerization engine to control or interact with the daemon through automated scripting or via direct CLI commands. In response to the instructions received from the CLI, via the REST API, the daemon may create and manage the objects of the containerization software 203, including one or more software images residing within the containers 211, the containers 211 themselves, networks, data volumes, plugins, etc. An image may be a read-only template with instructions for creating a container 211 and may be customizable. Containers 211 may be a runnable instance of the software image. Containers 211 can be created, started, stopped, moved or deleted using a containerization software 203 API or via the CLI. Containers 211 can be connected to one or more networks 150, can be attached to a storage device and/or create a new image based on the current state of a container 211.

Embodiments of the host system 201, illustrated in the block diagram of FIG. 2B, depicts a plurality of containers 211a-211c, wherein a container 211 may comprise an image of a digital twin module 103 and software dependencies 209a-209c (generally referred to herein as software dependencies 209) for running instances of the digital twin module 103 within the environment of the container 211. Software dependencies 209 may include application code, system tools, settings, runtime environment and system libraries. The images of the digital twin module 103 depicted within the containers 211 may be duplicate versions of the digital twin module 103 image. In some embodiments, the images of the digital twin module 103 may be customized variations of one another, based on a common image used as the basis for the customized variations of the digital twin module 103, while in some embodiments, one or more of the digital twin modules 103 may be independently created and developed using entirely different images.

Method for Simulating Lubricants of a Digital Twin Workflow

Figure 7:
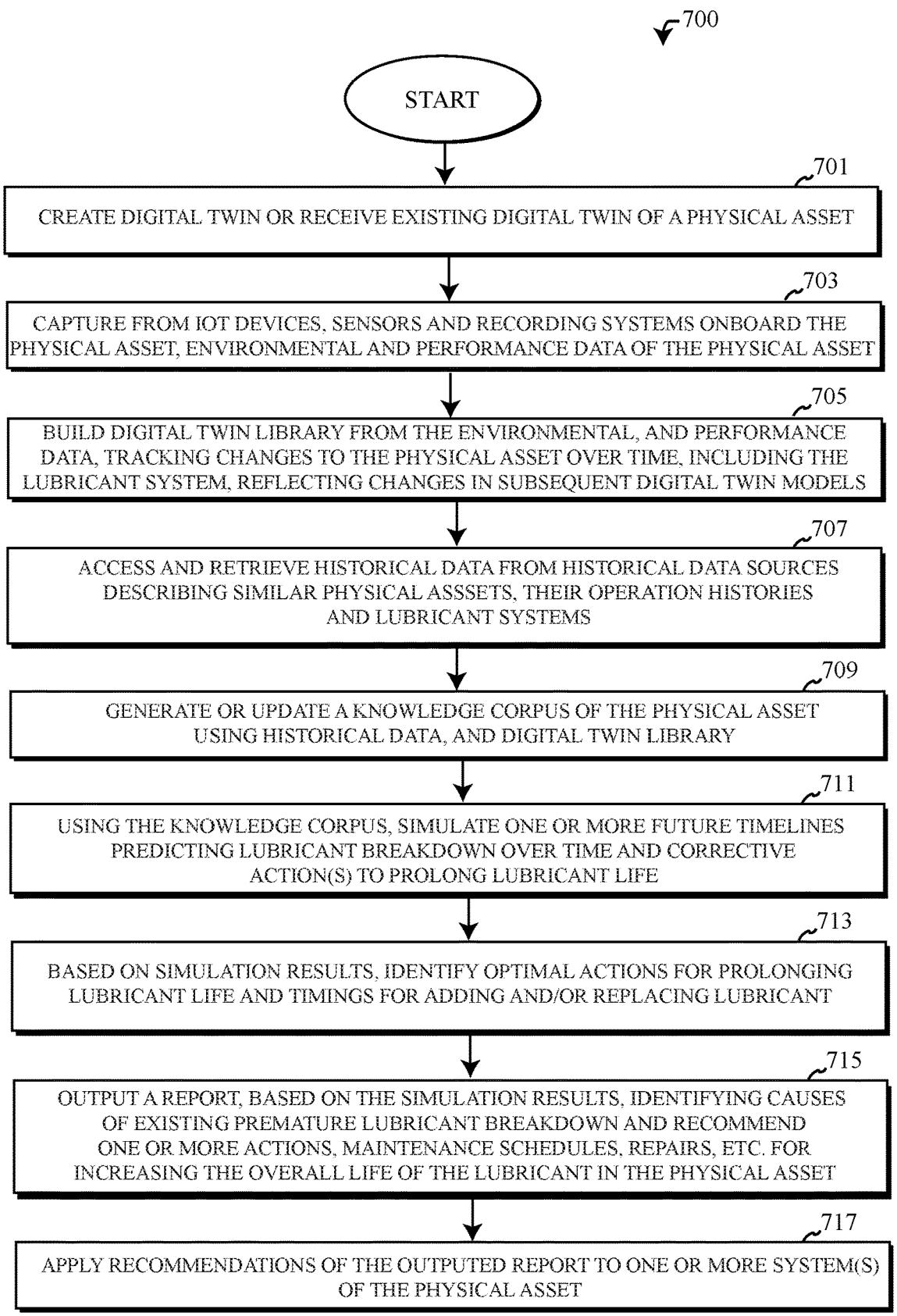
FIG. 7 illustrates a flowchart describing an embodiment of an algorithm implementing a method for optimizing a lubricant of a physical asset represented by a digital twin, in accordance with the present disclosure.

The drawings of FIG. 7 represent an embodiment of an algorithm 700 performing a computer-implemented method for simulating effects on lubricants in a workflow activity of a physical asset 117 using digital twin models 134 and/or models of components and parts from multiple digital twin models 134 predict timings for lubricant breakdown, the effects of actions or events on lubricants of the physical asset 117, lubricant properties that may be best suited for a particular operating environment, the optimal timings for replacing lubricants within the physical asset and/or recommendations for optimizing the lubricant systems for a particular operation environment, workload, configuration, etc. The algorithm 700, may use one or more computer systems, defined generically by data processing system 10 of FIG. 1, and more specifically by the embodiments of specialized data processing systems depicted in FIGS. 2a-6D, as described herein. A person skilled in the art should recognize that the steps of the algorithm 700 described in FIG. 7 may be performed in a different order than presented. The algorithm 700 may not necessarily require all the steps described herein to be performed. Rather, some embodiments of algorithm 700 may alter the methods by performing a subset of steps using one or more of the steps discussed below.

Embodiments of the algorithm 700 may begin at step 701. In step 701, a digital twin system 101 or host system 201 loaded with the digital twin module 103 may receive a request to create a digital twin model 134 of a physical asset 117 or associate an existing digital twin model 134 with a new user or owner of the existing digital twin (i.e. a transfer of ownership of the physical asset 117). Wherein step 701, a new digital twin is requested to be created, the creation engine 105 may create a digital twin model 134 of the physical asset 117 based on the specifications and configuration of the physical asset's 117 current state. For example, for a brand new physical asset 117 delivered from the manufacturer, the initial version of the digital twin model 134 may be an initial version depicting the base form of the physical asset 117, unmodified, whereas an existing physical asset 117 changing ownership could be entered into the digital twin module 103 comprising a plurality of different versions of digital twin models 134 exhibiting documented changes to the physical asset 117 over a period of time.

In step 703 of algorithm 700, one or more data collection devices 119, 121, 123 equipped by the physical asset 117 or in communication with the physical asset, may generate operational data describing the performance and environment of the physical asset 117 while operational. The data generated by the data collection devices 119, 121, 123 can be streamed from the data collection devices 119, 121, 123 to a data collection engine 107 capturing the data being received. For example as a real-time data feed 503 comprising information describing status of a lubricant, lubricant types, lubricant viscosity, and other features describing the state of the lubricant, as well as performance data of parts and components, temperature in one or more locations of the physical asset, visual heat patterns and images at one or more particular locations (for example, thermal images). Embodiments of the data collection engine 107 capturing the data from the data collection devices 119, 121, 123 may extract the data being streamed from the real-time data feed and the extracted data may be stored by the data collection engine 107 as part of a collected dataset 135 and/or as part of one or more records of a knowledge corpus 137. Data collection devices 119, 121, 123 may include one or more sensor devices 119, IoT devices 121, recording systems 123 (such as cameras, recorders, ultrasound scanners, and thermal imaging devices). The collected datasets 135 can be stored as part of a repository 131. Embodiments of data collection engine 107 may aggregate, organize and format the data generated by the collection devices 119, 121, 123 for easier searching, recall and processing by one or more additional components, engines or modules of the digital twin module 103.

In step 705 of algorithm 700, the digital twin module 103 may use the collected datasets 135 extracted from the real-time data feed to build a digital twin library describing the physical asset, including a plurality of digital twin models 134 describing the performance and environment of the physical asset in real-time, as the changes occur. In some embodiments, any changes to the physical asset 117 based on the changes to the collected datasets 135, including changes indicative of a change to one or more parts, components, settings, configurations, applications or changes to the lubricant or lubricant system, etc. can be reflected in a new digital twin model 134 being created to reflect or update the state of the physical asset 117. In the case of a change to the lubricant, the digital twin model 134 may indicate the new state of the lubricant on a real-time basis, as well as an amount of lubricant provided and properties of the lubricant. Changes to the physical asset 117 being tracked as a function of the collected datasets 134 may be plotted onto a timeline temporally registering the creation of each digital twin module 134 onto a timeline 501 and describing the change to the physical asset 117 that brought about the creation of a new digital twin model registered to the timeline 501.

In step 707 of algorithm 700, the digital twin module 103 may access and retrieve historical data describing one or more similar physical assets, the operation histories of said similar physical assets and histories of the lubricants and/or lubricant systems of the similar assets that may be stored as part of one or more historical data sources 141. For example, historical data sources may be manufacturer databases, website and repositories collecting and sharing performance data, operational data, state information, collected data sets and other data describing the history of one or more physical assets, that may be similar to a physical asset 117 owned by a user of the digital twin module 103. For instance, users of a particular type of physical asset provided by a manufacturer may share data that describes the history of the physical asset, including the performance of the asset, repairs, damage, maintenance, and other characteristics, parameters and changes to the physical asset over time, including changes to the state of the lubricants and lubricant systems, as well as the overall evolution of the physical asset as the assets change over time.

In step 709, using the collected datasets 135 of the physical asset 117, the digital twin library 133 and/or the historical data collected from one or more historical sources 141, the digital twin module 103 may create and/or update existing records of a knowledge corpus 137 describing one or more events and/or actions applied to the physical asset 117 over time and/or the events or actions applied to historically similar physical assets, from which the knowledge corpus module 109 may draw conclusions or derive inferences therefrom about the physical asset 117. In step 711, using the records of the knowledge corpus 137, the simulation engine 111 may perform a plurality of simulations that may predict one or more simulated timelines 601 predicting the evolution of the physical asset 117. Such predictions may include predictions about the impact of one or more events and/or actions on the physical asset, predictions about the breakdown of lubricant within the physical asset 117 over time, corrective actions that may prolong the life of the lubricant, the types of lubricants that may prolong the occurrence of lubricant breakdown, including simulations predicting the environmental effects and workload of the physical asset 117 on the breakdown of the lubricants.

In step 713 of algorithm 700, the simulation engine 111 may output the simulation results to the knowledge corpus module 109, which may in turn store the simulation results to the knowledge corpus 137. In some embodiments, the knowledge corpus 137 may analyze the simulation results being stored to the knowledge corpus 137, and based on the simulation results and in view of the records of the knowledge corpus 137, the knowledge corpus 137 may identify and/or recommend one or more recommendations or actions to perform on the physical asset that may optimize and/or prolong the life of a lubricant, maximize the timing for adding or replacing lubricant and/or maximize the lifespan of lubricant before the lubricant breakdown is observed.

In step 715 of algorithm 700, the reporting engine 113 may output a report describing the one or more recommendations and/or actions suggested by the knowledge corpus 137 to prolong lubricant life span and optimize the amount of time before replacing the lubricant within the physical asset 117. Embodiments of the report being generated may identify existing causes of premature lubricant breakdown and may include actions to alleviate the underlying causes of the premature lubricant breakdown. The one or more actions for resolving underlying issues my include recommendations implementing one or more actions, maintenance schedules, repairs of parts and components, re-aligning misaligned parts, replacing lubricants with lubricants containing more effective or desirable properties for particular working conditions, etc. In step 717, the recommendations being suggested as part of the report may be applied to one or more systems of the physical asset 117. For example, by automatically scheduling the implementation of the one or more recommended actions, repairs, adjustments, modifications and/or maintenance schedules in some embodiments. Whereas, in other embodiments, the digital twin module 103 may present the user with reminders of the recommendations and/or actions and the user may manually select and choose which recommendations or actions to apply to the physical asset 117.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
  creating, by at least one processor, a digital twin model representing a physical asset comprising one or more components and a lubricant;
  capturing, by the at least one processor, a data feed from at least one data collection device connected to the physical asset, wherein the data feed describes operation conditions of the physical asset, including a state of the lubricant, wherein a data collection device of the at least one data collection device is a thermal imaging camera, the data feed includes one or more thermal images of the physical asset, and the one or more thermal images depict an increasing amount of heat present at an interface between two of the one or more components;
  determining, by the at least one processor, contributing factors to one or more differences between predicted performance of the one or more components of the digital twin model and performance of the one or more components represented in the data feed, by applying machine learning to data extracted from the data feed;
  updating, by the at least one processor, the digital twin model based on the determined contributing factors to reflect the performance of the one or more components of the physical asset and further updating a knowledge corpus with the data;
  simulating, by the at least one processor, using the updated digital twin model, a plurality of temporal sequences based on the knowledge corpus to predict one or more actions and resulting effects of the one or more actions on a breakdown of the lubricant over a time period, wherein simulating comprises predicting the increasing amount of the heat present at the interface between the two of the one or more components as a function of the one or more thermal images and the one or more actions predicted to maximize an amount of time before the physical asset experiences the breakdown of the lubricant;

identifying, by the at least one processor, a temporal sequence from the plurality of temporal sequences comprising the one or more actions predicted to maximize the amount of time before the physical asset experiences the breakdown of the lubricant;

outputting, by the at least one processor, a recommendation comprising the one or more actions predicted to maximize the amount of time before the physical asset experiences the breakdown of the lubricant; and applying, by the at least one processor, the one or more actions predicted to maximize the amount of time before the physical asset experiences the breakdown of the lubricant to the digital twin model.

2. The computer-implemented method of claim 1, wherein another data collection device of the at least one data collection device connected to the physical asset is selected from the group consisting of a sensor device, internet-of-things (IoT) device, a recording system and a combination thereof.

3. The computer-implemented method of claim 1, wherein the one or more actions include replacing one or more components experiencing the increasing amount of heat present at the interface and replacing the lubricant of the physical asset.

4. The computer-implemented method of claim 1, further comprising:
outputting, by the at least one processor, simulation results comprising the plurality of temporal sequences, wherein each temporal sequence includes a plurality of simulated digital twins of the physical asset positioned along a timeline of the temporal sequences describing the one or more actions at each point in the timeline and an outcome describing a lifespan of the lubricant for each of the simulation results or a recommended length of time for performing a replacement of the lubricant.

5. The computer-implemented method of claim 4, wherein the one or more actions at each point in the timeline include replacement of the one or more components, repair of the one or more components, maintenance of the physical asset, adjusting timings or settings of the physical asset, replacement of the lubricant, introducing a new lubricant, and combination of actions thereof.

6. A computer system comprising:
at least one processor;
at least one data collection device placed in communication with the at least one processor; and
a computer-readable storage media coupled to the at least one processor, wherein the computer-readable storage media contains program instructions executing a computer-implemented method comprising:
creating, by the at least one processor, a digital twin model representing a physical asset comprising one or more components and a lubricant;
capturing, by the at least one processor, a data feed from at the least one data collection device connected to the physical asset, wherein the data feed describes operation conditions of the physical asset, including a state of the lubricant, wherein a data collection device of the at least one data collection device is a thermal imaging camera, the data feed includes one or more thermal images of the physical asset, and the one or more thermal images depict an increasing amount of heat present at an interface between two of the one or more components;
determining, by the at least one processor, contributing factors to one or more differences between predicted performance of the one or more components of the digital twin model and performance of the one or more components represented in the data feed, by applying machine learning to data extracted from the data feed;
updating, by the at least one processor, the digital twin model based on the determined contributing factors to reflect the performance of the one or more components of the physical asset and further updating a knowledge corpus with the data;
simulating, by the at least one processor, using the updated digital twin model, a plurality of temporal sequences based on the knowledge corpus to predict one or more actions and resulting effects of the one or more actions on a breakdown of the lubricant over a time period, wherein simulating comprises predicting the increasing amount of the heat present at the interface between the two of the one or more components as a function of the one or more thermal images and the one or more actions predicted to maximize an amount of time before the physical asset experiences the breakdown of the lubricant;
identifying, by the at least one processor, a temporal sequence from the plurality of temporal sequences comprising the one or more actions predicted to maximize the amount of time before the physical asset experiences the breakdown of the lubricant;
outputting, by the at least one processor, a recommendation comprising the one or more actions predicted to maximize the amount of time before the physical asset experiences the breakdown of the lubricant; and
applying, by the at least one processor, the one or more action predicted to maximize the amount of time before the physical asset experiences the breakdown of the lubricant to the digital twin model.

7. The computer system of claim 6, wherein another data collection device of the at least one data collection device connected to the physical asset is selected from the group consisting of a sensor device, internet-of-things (IoT) device, a recording system and a combination thereof.

8. The computer system of claim 6, wherein the one or more actions include replacing one or more components experiencing the increasing amount of heat present at the interface and replacing the lubricant of the physical asset.

9. The computer system of claim 6, further comprising:
outputting, by the at least one processor, simulation results comprising the plurality of temporal sequences, wherein each temporal sequence includes a plurality of simulated digital twins of the physical asset positioned along a timeline of the temporal sequences describing the one or more actions at each point in the timeline and an outcome describing a lifespan of the lubricant for each of the simulation results or a recommended length of time for performing a replacement of the lubricant.

10. The computer system of claim 9, wherein the one or more actions at each point in the timeline include replacement of the one or more components, repair of the one or more components, maintenance of the physical asset, adjusting timings or settings of the physical asset, replacement of the lubricant, introducing a new lubricant, and combination of actions thereof.

11. A computer program product comprising:
one or more computer-readable storage media having computer-readable program instructions stored on the one or more computer-readable storage media said program instructions executes a computer-implemented method comprising:

creating, by at least one processor, a digital twin model representing a physical asset comprising one or more components and a lubricant;

capturing, by the at least one processor, a data feed from at least one data collection device connected to the physical asset, wherein the data feed describes operation conditions of the physical asset, including a state of the lubricant, wherein a data collection device of the at least one data collection device is a thermal imaging camera, the data feed includes one or more thermal images of the physical asset, and the one or more thermal images depict an increasing amount of heat present at an interface between two of the one or more components;

determining, by the at least one processor, contributing factors to one or more differences between predicted performance of the one or more components of the digital twin model and performance of the one or more components represented in the data feed, by applying machine learning to data extracted from the data feed;

updating, by the at least one processor, the digital twin model based on the determined contributing factors to reflect the performance of the one or more components of the physical asset and further updating a knowledge corpus with the data;

simulating, by the at least one processor, using the updated digital twin model, a plurality of temporal sequences based on the knowledge corpus to predict one or more actions and resulting effects of the one or more actions on a breakdown of the lubricant over a time period, wherein simulating comprises predicting the increasing amount of the heat present at the interface between the two of the one or more components as a function of the one or more thermal images and the one or more actions predicted to maximize an amount of time before the physical asset experiences the breakdown of the lubricant;

identifying, by the at least one processor, a temporal sequence from the plurality of temporal sequences comprising the one or more actions predicted to maximize the amount of time before the physical asset experiences the breakdown of the lubricant;

outputting, by the at least one processor, a recommendation comprising the one or more actions predicted to maximize the amount of time before the physical asset experiences the breakdown of the lubricant; and applying, by the at least one processor, the one or more actions predicted to maximize the amount of time before the physical asset experiences the breakdown of the lubricant to the digital twin model.

12. The computer program product of claim 11, wherein another data collection device of the at least one data collection device connected to the physical asset is selected from the group consisting of a sensor device, internet-of-things (IoT) device, a recording system and a combination thereof.

13. The computer program product of claim 11, wherein the one or more actions include replacing one or more components experiencing the increasing amount of heat present at the interface and replacing the lubricant of the physical asset.

14. The computer program product of claim 11, further comprising:

outputting, by the at least one processor, simulation results comprising the plurality of temporal sequences, wherein each temporal sequence includes a plurality of simulated digital twins of the physical asset positioned along a timeline of the temporal sequences describing the one or more actions at each point in the timeline and an outcome describing a lifespan of the lubricant for each of the simulation results or a recommended length of time for performing a replacement of the lubricant and wherein the one or more actions at each point in the timeline include replacement of the one or more components, repair of the one or more components, maintenance of the physical asset, adjusting timings or settings of the physical asset, replacement of the lubricant, introducing a new lubricant, and combination of actions thereof.

* * * * *